(12) United States Patent
Inasako et al.

(10) Patent No.: US 11,890,971 B2
(45) Date of Patent: Feb. 6, 2024

(54) SLIDING DEVICE

(71) Applicant: DELTA KOGYO CO., LTD., Hiroshima (JP)

(72) Inventors: Yuu Inasako, Hiroshima (JP); Hiroshi Danjo, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 17/904,077

(22) PCT Filed: Mar. 23, 2021

(86) PCT No.: PCT/JP2021/011937
§ 371 (c)(1),
(2) Date: Aug. 11, 2022

(87) PCT Pub. No.: WO2021/193608
PCT Pub. Date: Sep. 30, 2021

(65) Prior Publication Data
US 2023/0075793 A1 Mar. 9, 2023

(30) Foreign Application Priority Data

Mar. 27, 2020 (JP) ................................ 2020-058109

(51) Int. Cl.
*B60N 2/08* (2006.01)
*B60N 2/07* (2006.01)

(52) U.S. Cl.
CPC .......... *B60N 2/0818* (2013.01); *B60N 2/0722* (2013.01)

(58) Field of Classification Search
CPC ...... B60N 2/0818; B60N 2/0722; B60N 2/07; B60N 2/08

(Continued)

(56) References Cited

U.S. PATENT DOCUMENTS 10,471,852 B2* 11/2019 Taniguchi ............ B60N 2/0705
10,717,373 B2* 7/2020 Watanabe ............ B60N 2/0881
(Continued)

FOREIGN PATENT DOCUMENTS

CN 103796870 A 5/2014
JP H02-49628 U 4/1990
(Continued)

OTHER PUBLICATIONS

The extended European search report issued by the European Patent Office dated Jun. 15, 2023, which corresponds to European Patent Application No. 21774117.2-1012 and is related to U.S. Appl. No. 17/904,077.

(Continued)

*Primary Examiner* — Nkeisha Smith
(74) *Attorney, Agent, or Firm* — Studebaker & Brackett PC

(57) ABSTRACT

Provided is a sliding device which can avoid unintended locking release without depending on an excessive engagement force of an engagement member. The sliding device includes a lock mechanism that locks an upper rail to a lower rail. The lock mechanism includes: an engagement member that shifts in the upper rail between a locking position and a release position; a first urging member that gives an urging force to the engagement member in a direction from the release position to the locking position; and an operation member for shifting the engagement member from the locking position to the release position. The operation member comprises a shift restrictor that keeps the engagement member from shifting to the release position when the engagement member is in the locking position.

8 Claims, 17 Drawing Sheets

(58) Field of Classification Search
USPC .................................................. 248/428, 429
See application file for complete search history.

(56) References Cited

U.S. PATENT DOCUMENTS

| | | |
|---|---|---|
| 10,933,772 B2 * | 3/2021 | Sprenger .............. B60N 2/0705 |
| 11,052,789 B2 * | 7/2021 | Kumagai ............. B60N 2/0875 |
| 2009/0058169 A1 * | 3/2009 | Soga .................... B60N 2/0705 |
| | | 297/463.1 |
| 2014/0203157 A1 | 7/2014 | Nagura et al. |
| 2020/0276919 A1 | 9/2020 | Kumagai et al. |
| 2021/0323448 A1 | 10/2021 | Inoue et al. |
| 2022/0281358 A1 * | 9/2022 | Carroll ................. B60N 2/0705 |
| 2022/0281360 A1 * | 9/2022 | Carroll ................. B60N 2/0843 |

FOREIGN PATENT DOCUMENTS

| | | |
|---|---|---|
| JP | H07-329617 A | 12/1995 |
| JP | 2013-100067 A | 5/2013 |
| WO | 2019/131056 A1 | 7/2019 |
| WO | 2020/031624 A1 | 2/2020 |

OTHER PUBLICATIONS

International Search Report issued in PCT/JP2021/011937; dated Jun. 1, 2021.
An Office Action mailed by China National Intellectual Property Administration dated Apr. 25, 2023, which corresponds to Chinese Patent Application No. 202180016069.1 and is related to U.S. Appl. No. 17/904,077; with English summary.

* cited by examiner

SLIDING DEVICE

TECHNICAL FIELD

The present invention relates to a sliding device for supporting a seat slidably in a front-rear direction and locking the seat at a desired position in the front-rear direction.

BACKGROUND ART

A sliding device for supporting a seat slidably in a front-rear direction and locking the seat in a desired position in the front-rear direction has been conventionally and widely adopted in a seat for an automobile.

Such a sliding device has, for example, a structure disclosed in Patent Literature 1. The sliding device includes: a lower rail fixedly attached to a floor surface of an automobile in a front-rear direction of a seat; and an upper rail fixedly attached to the seat and guided by the lower rail movably in the front-rear direction. The lower rail has a plurality of locking holes arrayed in a longitudinal direction thereof.

The sliding device has a sliding lock mechanism that locks the upper rail at a desired position. The sliding lock mechanism includes: a locking member (corresponding to a lock plate in Patent Literature 1) as an engagement member having a plurality of lock teeth to be fitted in locking holes; a spring member that urges the locking member in a direction of fitting the lock teeth in the locking holes; and a locking release lever for shifting the locking member in a locking release direction.

The sliding device maintains the locking member in the locking position where the lock teeth are fitted in the locking holes with urging force of the spring member before the locking release lever is operated. The sliding device also causes the locking member to shift in the locking release direction against the urging force of the spring member by the operation of the lever to achieve release of the locking.

As described above, the sliding device of Patent Literature 1 can lock the upper rail and the seat fixedly attached to the upper rail at a predetermined position by fitting of the lock teeth of the locking member in the locking holes of the lower rail. However, this does not ensure reliable locking, and still remains a risk of occurrence of unintended locking release (e.g., unintended locking release attributed to a vertical bounce of a vehicle while travelling) even without an application of an operation force to the locking release lever.

Meanwhile, it is considered to decrease a wedge angle of each lock tooth (i.e., to make opposite side edge sections of the lock tooth parallel so that the lock tooth has a substantially rectangular shape) for ensuring a friction force between the lock tooth and the lock hole with the aim of improving an engagement force (locking force) of the locking member serving as the engagement member. However, the decrease in the wedge angle of the rock tooth may give negative influence on operation feeling due to too close fitting (e.g., excessive engagement force) of the lock tooth in the locking hole, or may cause an operation failure related to the locking release in some cases.

CITATION LIST

Patent Literature

Patent Literature 1: Japanese Unexamined Patent Publication No. 2013-100067

SUMMARY OF INVENTION

An object of the present invention is to provide a sliding device which can avoid unintended locking release without depending on an excessive engagement force of an engagement member.

Means for Solving the Problem

To achieve the object, a sliding device according to the present invention is a sliding device for supporting a seat slidably in a front-rear direction and locking the seat in a desired position in the front-rear direction. The sliding device includes: a lower rail fixedly attached to a mounting surface over which the seat is placed; an upper rail having a portion to be fixedly attached to the seat, and guided by the lower rail movably in the front-rear direction; and a lock mechanism that locks the upper rail to the lower rail. The lower rail has a plurality of engaged parts arrayed in a longitudinal direction thereof. The lock mechanism includes: an engagement member that has an engaging part engageable with at least selected one of the engaged parts of the lower rail, and shifts between a locking position to keep the upper rail from moving by the engagement of the engaging part with the engaged part and a release position to release the locking; a first urging member that gives an urging force to the engagement member in a direction from the release position to the locking position; an operation member for shifting the engagement member from the locking position to the release position upon receiving an application of an operation force; and a shift restrictor that keeps the engagement member from shifting to the release position when the engagement member is in the locking position and no operation force is applied to the operation member.

DESCRIPTION OF EMBODIMENTS

Hereinafter, a preferable embodiment of a sliding device of the present invention will be described with reference to the accompanying drawings.

First Embodiment

Figure 1:
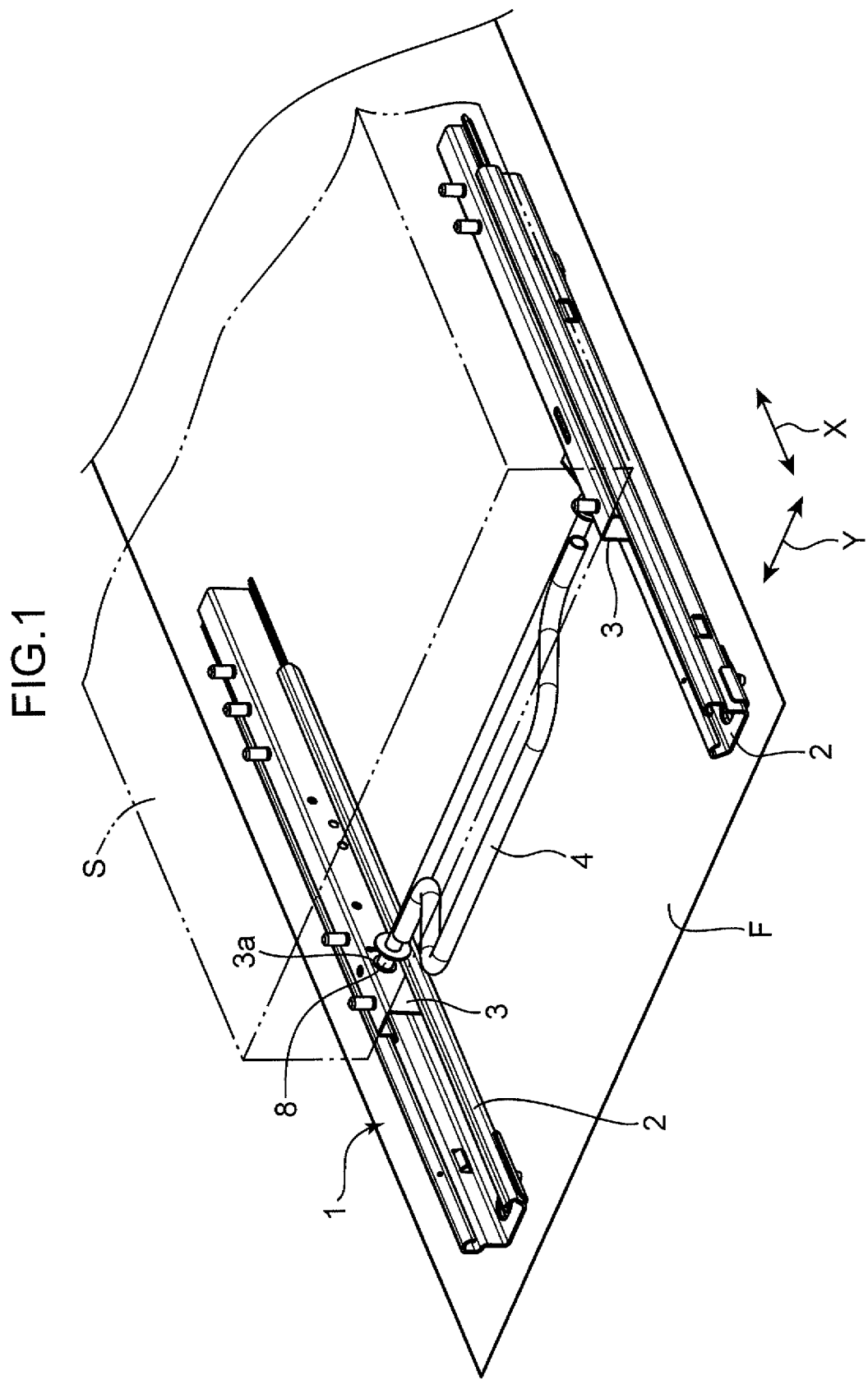
FIG. 1 is an overall perspective view of a sliding device according to a first embodiment of the present invention.

As shown in FIG. 1, a sliding device 1 according to the first embodiment has, for example, a configuration for supporting a seat S as an automobile seat slidably in a front-rear direction X of the seat S and locking the seat at a desired position in the front-rear direction X.

Specifically, the sliding device 1 includes: a pair of lower rails 2; a pair of upper rails 3; a lock mechanism 20 (see FIGS. 2 to 3) provided in each of the upper rails 3 to lock sliding of the corresponding upper rail 3; and an operation lever 4 for releasing the locking by the lock mechanism 20.

The lower rails 2 are fixedly attached to a floor surface F of the automobile at a distance therebetween, the floor surface serving as a mounting surface over which the seat S is placed in the front-rear direction X.

Figure 6:
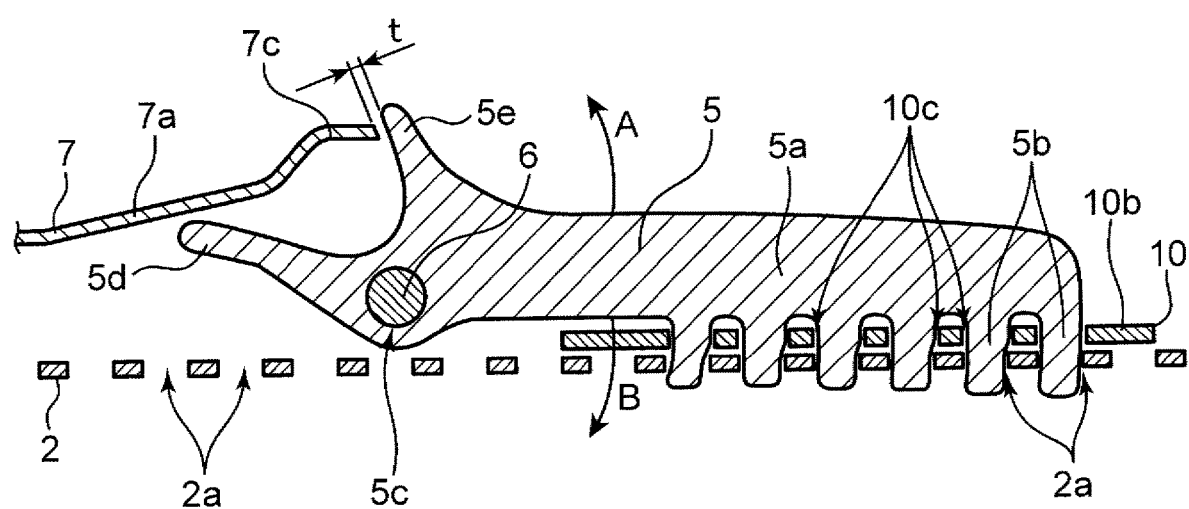
FIG. 6 is a cross-sectional explanatory view showing a state where the locking member shown in FIG. 3 is in a locking position.

Each lower rail 2 has a bottom surface formed with a plurality of engaged holes 2a (engaged parts) shown in FIG. 6. The engaged holes 2a are arrayed at regular intervals in a longitudinal direction (i.e., the front-rear direction X) of the lower rail 2.

Each upper rail 3 has a portion (e.g., a stud bolt protruding upward) fixedly attached to the seat S. The upper rail 3 is guided by the corresponding lower rail 2 movably in the front-rear direction X.

The upper rail 3 has a side wall formed with a through hole 3a for receiving a below-described operation shaft 8 to be inserted therein.

The lock mechanism 20 is configured to lock the upper rail 3 to the lower rail 2 as shown in FIGS. 2 to 6.

The lock mechanism 20 specifically includes: a locking member 5 (engagement member); a support shaft 6 that rotatably supports the locking member 5; a lever plate 7 (operation member); the operation shaft 8 for operating a rotation of the lever plate 7; a lock spring 11 (first urging member) that urges the locking member 5 in a locking direction (arrow-B direction in FIG. 6); and a lever spring 12 (second urging member) that rotationally urges the lever plate 7 in a direction (second direction II in FIG. 5) away from the locking member 5.

Figure 2:
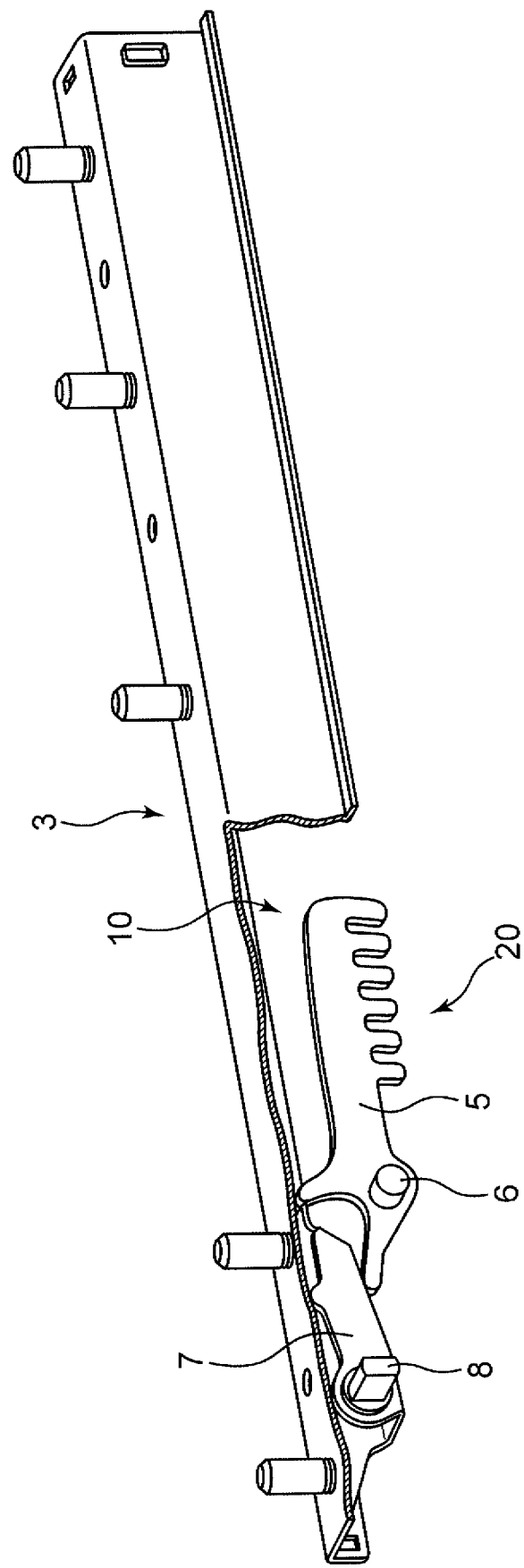
FIG. 2 is a partly notched perspective view showing a locking member and a lever plate inside an upper rail shown in FIG. 1.
Figure 3:
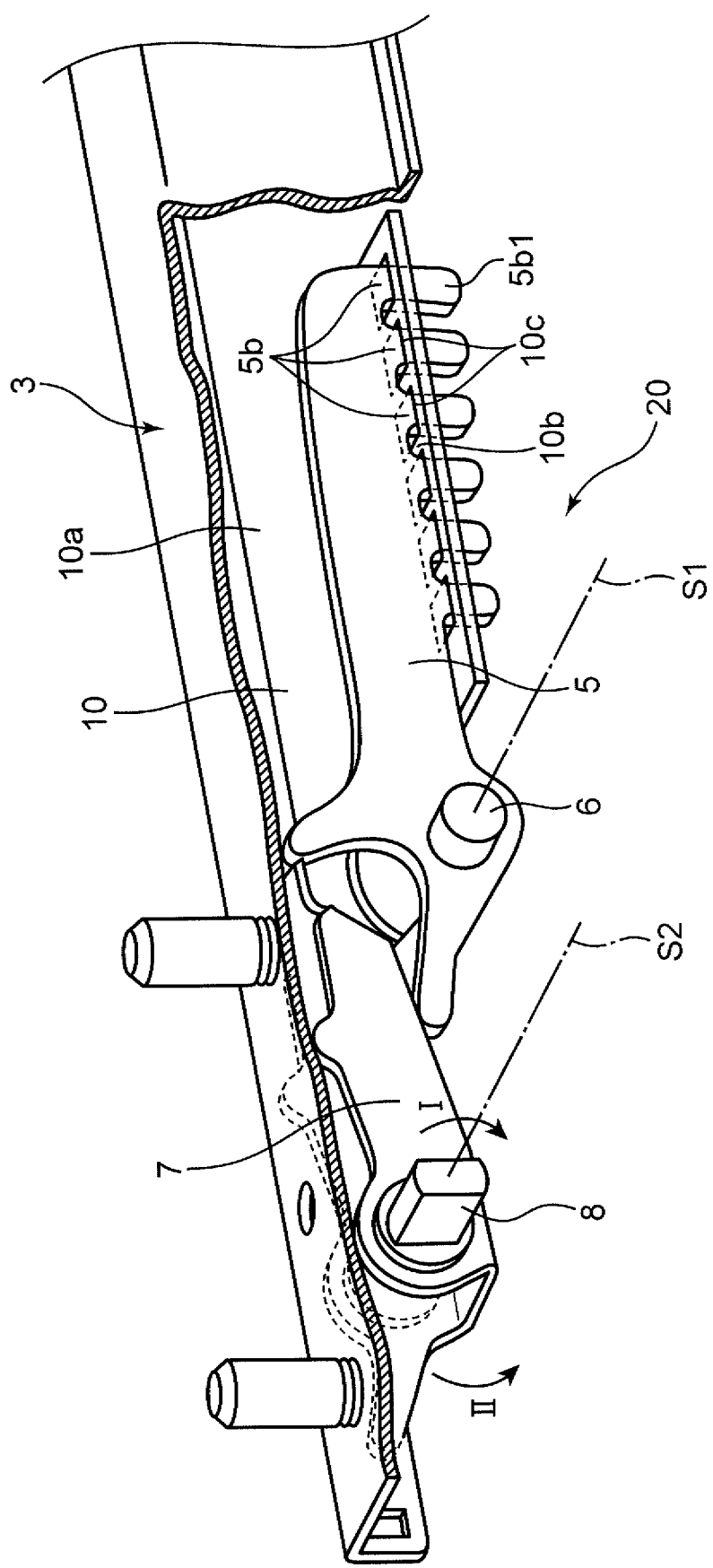
FIG. 3 is an enlarged perspective view of the locking member and the lever plate shown in FIG. 2.
Figure 4:
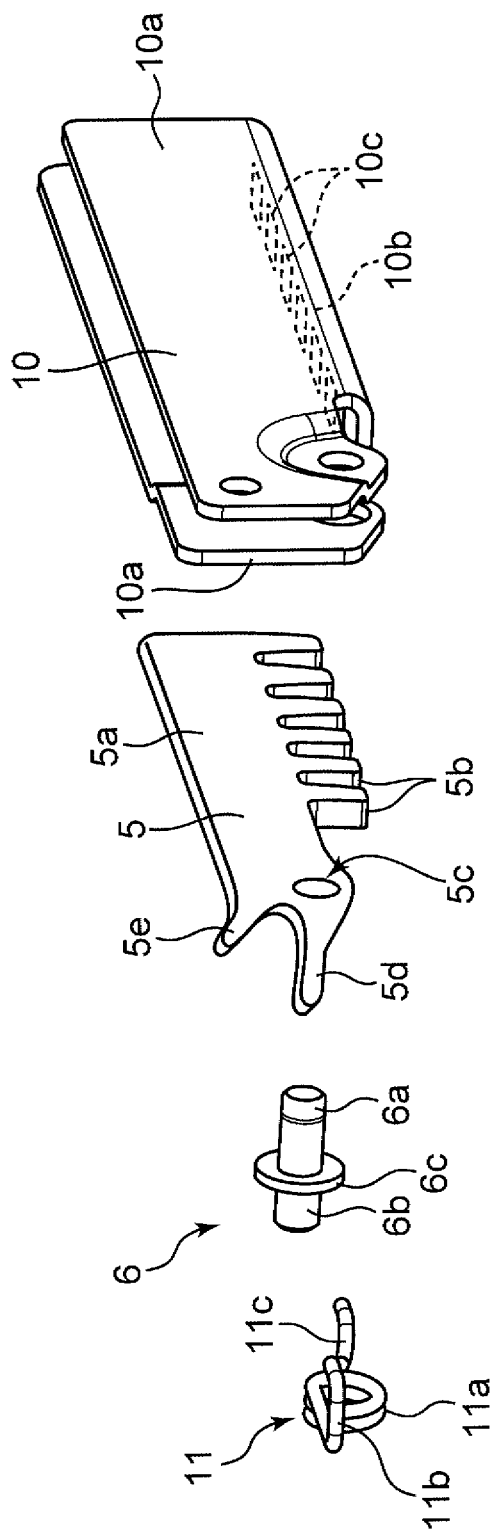
FIG. 4 is an exploded perspective view of a configuration for rotatably supporting the locking member shown in FIG. 3.

As shown in FIGS. 2 to 4, the locking member 5 has a slender and long plate shape, and has a plurality of lock teeth 5b each engageable with at least selected one of the engaged holes 2a of the lower rail 2.

Specifically, the locking member 5 has the lock teeth 5b protruding downward at a lower end thereof ranging from a leading end of a main body 5a of the locking member 5 to about the center thereof. Each of the lock teeth 5b forms an engaging part engageable with the at least selected one of the engaged holes 2a of the lower rail 2. Here, at least one lock tooth 5b sufficiently exerts the operability as the engaging part to be engaged with the engaged hole 2a of the lower rail 2.

The locking member 5 has an axial hole 5c for receiving the support shaft 6 to be inserted therein. The locking member 5 is arranged in a space defined between a pair of facing walls 10a of a holder 10 shown in FIGS. 3 to 4, and is rotatable about the support shaft 6 inserted in the axial hole 5c, and supported by the support shaft 6. The support shaft 6 (specifically, a main part 6a on the right side of FIG. 4) penetrates the facing walls 10a of the holder 10 in such a way as to extend along a first rotation axis S1 extending in a width direction Y of the seat S. The lock tooth 5b of the locking member 5 can protrude downward of the holder 10 via a through hole 10c formed in a bottom wall 10b of the holder 10.

The locking member 5 rotatably supported by the support shaft 6 in this way as shown in FIGS. 2 to 4 is rotatable in the upper rail 3 about the first rotation axis S1 to shift between a locking position (that is the position of the locking member 5 in FIG. 6) to keep the upper rail 3 from moving by the engagement of the lock tooth Sb with the engaged hole 2a and a release position (that is the position where the lock tooth Sb disengages from the engaged hole 2a after the locking member 5 shown in FIG. 6 shifts in the arrow-A direction) to release the locking.

Besides, as shown in FIG. 4 and FIG. 6, the locking member 5 has a locking release protrusion 5d located opposite the lock teeth 5b across the axial hole 5c; the locking release protrusion 5d receives from the lever plate 7 an operation force that make the locking member 5 swing into the locking release direction (arrow-A direction in FIG. 6) of releasing the engagement of the lock tooth 5h with the engaged hole 2a. The locking member 5 further includes a below-described second locking protrusion 5e extending upward above the axial hole 5c at a distance from the locking release protrusion 5d.

The lock spring member 11 gives an urging force to the locking member 5 in the arrow-B direction from the release position to the locking position shown in FIG. 6. Specifically, as shown in FIG. 4, the lock spring 11 is constituted by a twisted spring coil giving a rotational urging force to the locking member 5 in a locking direction (arrow-B direction in FIG. 6) of the engagement of the lock tooth 5b with the engaged hole 2a. The lock spring 11 has a coil part 11a engaged with a proximal end 6b of the support shaft 6; the coil part 11a is prevented by a flange 6c from moving in an axial direction. The lock spring 11 has one end 11c coming into contact with the holder 10 from below to regulate the rotation and has another end 11b coming into contact with the locking release protrusion 5d of the locking member 5 to give the rotational urging force in the direction (arrow-B direction in FIG. 6) of pushing the locking release protrusion 5d upward. The lock spring 11 can give the rotational urging force to the locking member 5 in the direction (arrow-B direction in FIG. 6) of the engagement of the lock tooth 5b with the engaged hole 2a.

Figure 7:
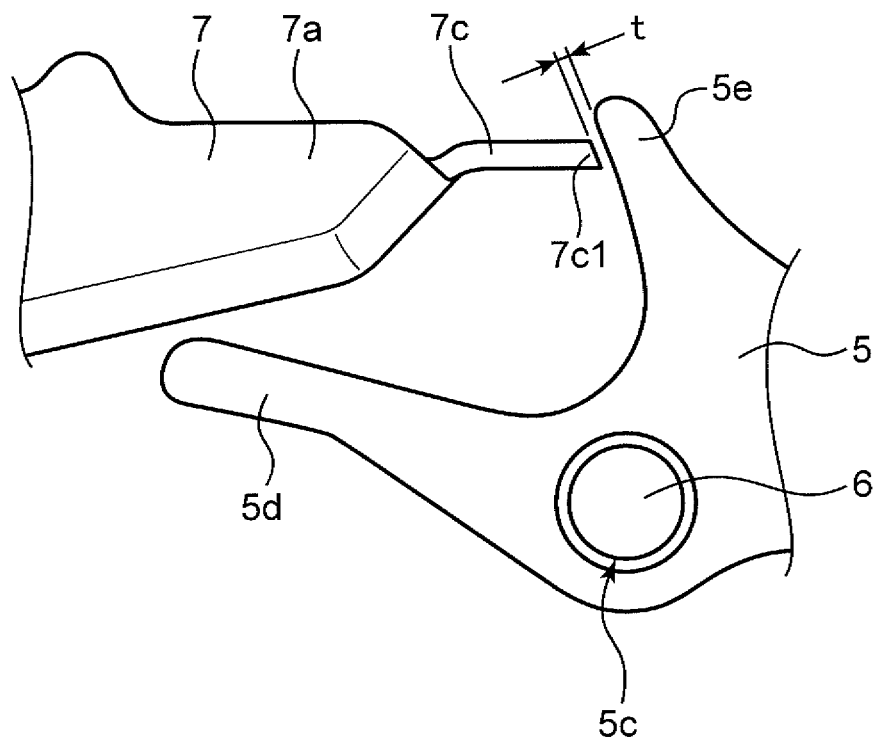
FIG. 7 is an enlarged view showing a first locking protrusion of the lever plate and therearound, and a second locking protrusion of the locking member and therearound in the state where the locking member shown in FIG. 3 is in the locking position.

The lever plate 7 is a member for shifting the locking member 5 in the arrow-A direction from the locking position in FIG. 6 to the release position upon receiving an application of an operation force. Specifically, as shown in FIGS. 5 to 7, the lever plate 7 includes: a main body 7a having a fit hole 7b; a first locking protrusion 7c (first protrusion); a first rotation regulation stopper 7d; and a second rotation regulation stopper 7e.

Figure 5:
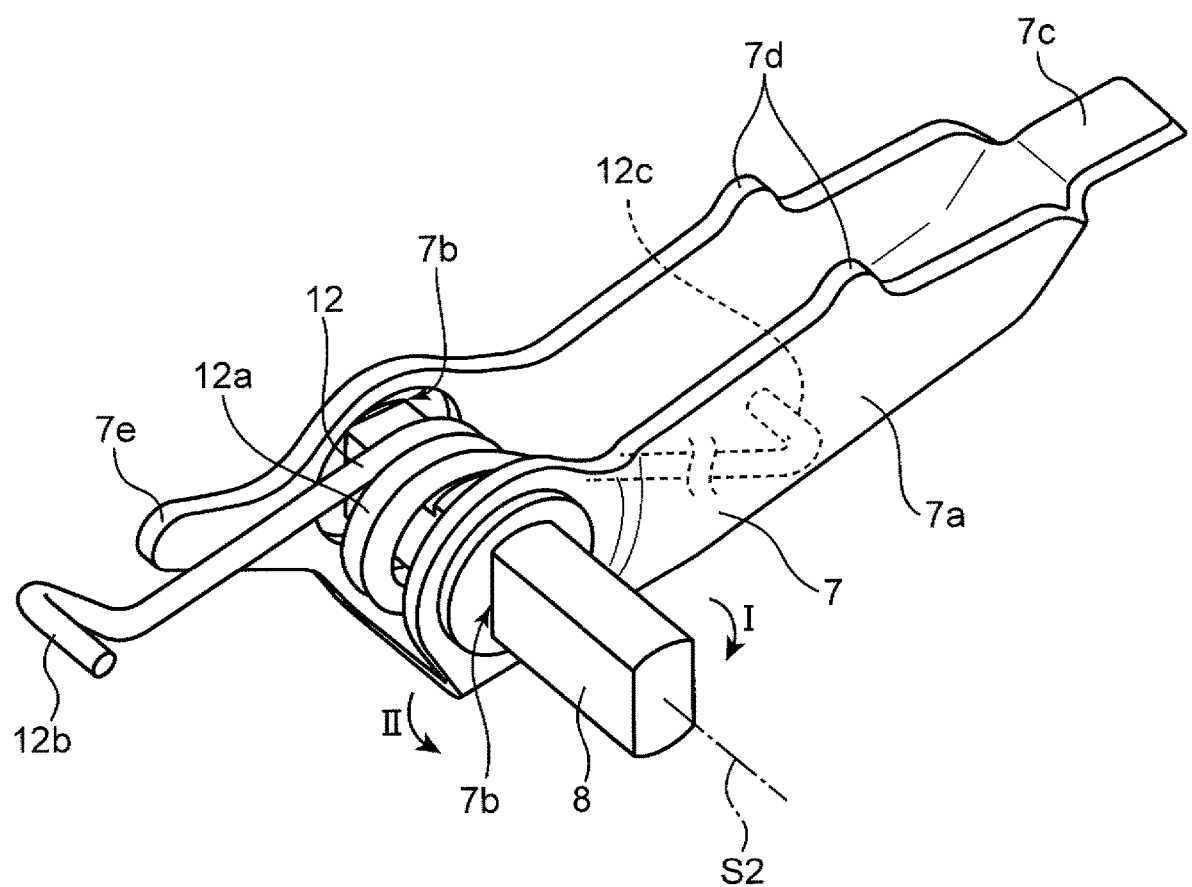
FIG. 5 is a perspective view showing an assembled state of the lever plate, a lever spring, and an operation shaft shown in FIG. 3.
Figure 8:
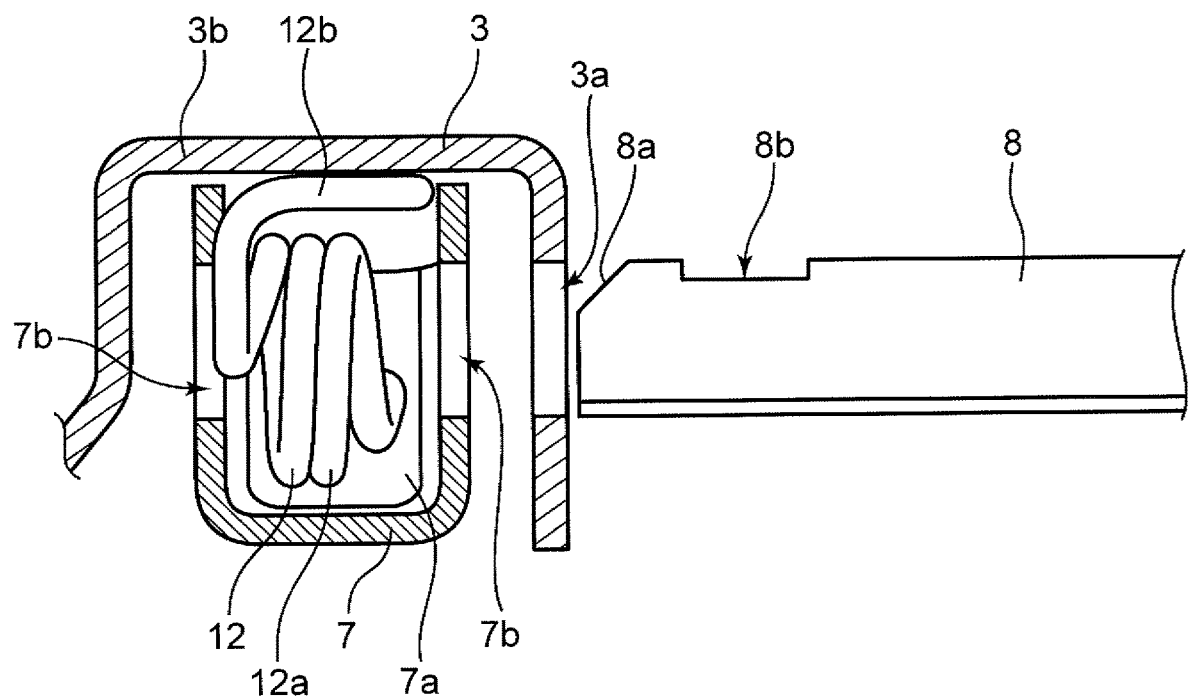
FIG. 8 is a cross-sectional explanatory view showing a state before the operation shaft shown in FIG. 3 is inserted in a through hole of each of the upper rail and the lever plate.
Figure 9:
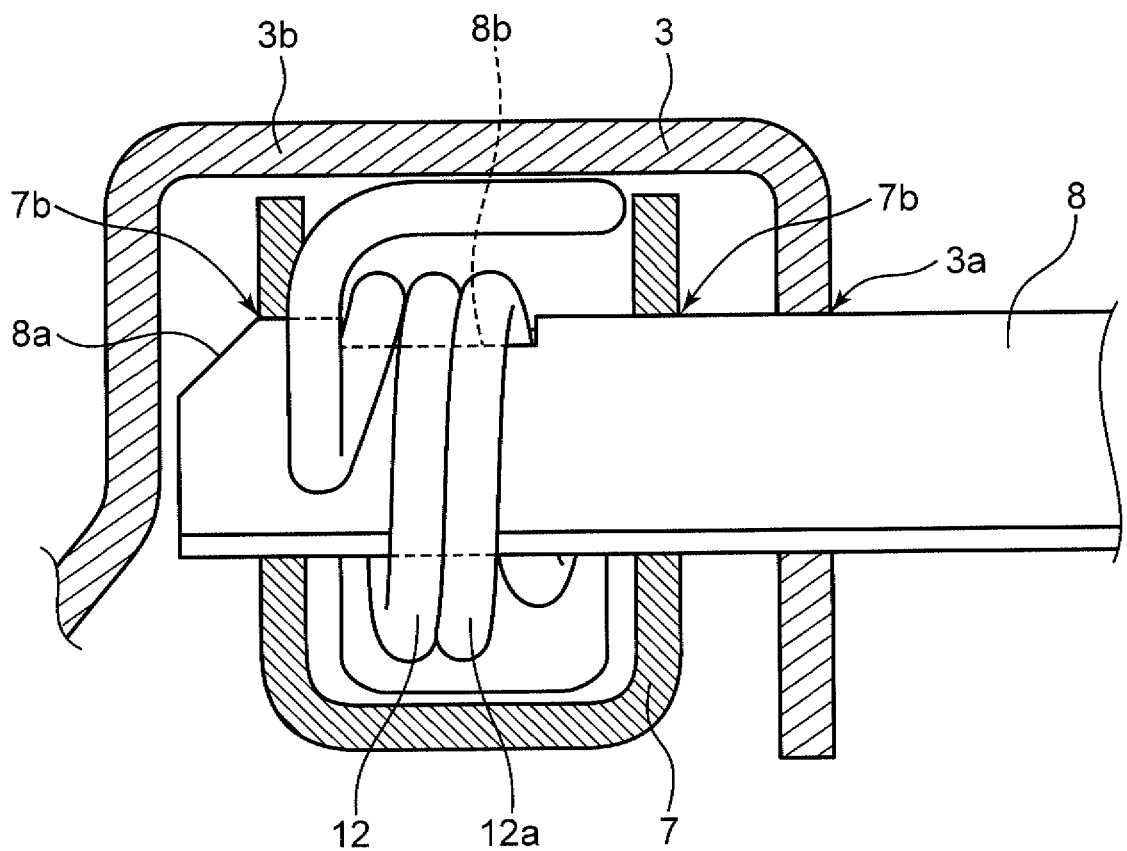
FIG. 9 is a cross-sectional explanatory view showing a state where a coil part of the lever spring is fitted in a recess of the operation shaft after completion of the insertion of the operation shaft shown in FIG. 3 into the through hole of each of the upper rail and the lever plate.

As shown in FIGS. 5 and 8 to 9, the main body 7a has a substantially U-shape in a cross-section which is substantially vertical to an extension direction, and has a pair of facing walls respectively formed with fit holes 7b each having a substantially rectangular shape. In the pair of fit holes 7b, the operation shaft 8 having a substantially rectangular shape in a cross-section which is substantially vertical to the extension direction is fitted. The operation shaft 8 rotates about a second rotation axis S2 and extends along the second rotation axis S2 to reach outside the upper rail 3 through the through hole 3a (FIG. 1 and FIGS. 8 to 9) in a side wall of the upper rail 3.

The main body 7a is supported by an unillustrated holder in the upper rail 3 to be rotatable in the upper rail 3 about the second rotation axis S2 and between a first direction I of applying the operation force to the locking member 5 and a second direction II (see FIG. 3) opposite to the first direction 1. The holder covering the main body 7a of the lever plate 7 is independent of the holder 10, but may be integrally formed with the holder 10 into a single body. In other words, a single holder may cover both the locking member 5 and the lever plate 7. In use of the single holder, the respective rotary shafts (the support shaft 6 and the operation shaft 8) of the locking member 5 and the lever plate 7 are rotatably supported by the holder. The configuration including the single holder can suppress an assembly error (relative deviation between the locking member 5 and the lever plate 7) more effectively than a configuration including holders individually for the locking member 5 and the lever plate 7.

The first locking protrusion 7c is provided as a shift restrictor at a leading end of the main body 7a, i.e., at an end away from the fit hole 7b, on the right side of FIG. 5.

As shown in FIG. 6, the first locking protrusion 7c is located at a side in a shifting direction (arrow-A direction in FIG. 6) towards the release position against the second locking protrusion 5e of the locking member 5 when the locking member 5 is in the locking position and no operation force is applied to the lever plate 7.

In other words, as shown in FIGS. 4, and 6 to 7, the second locking protrusion 5e (second protrusion) is located at a position to come into contact with the first locking protrusion 7c when the locking member 5 shifts in the arrow-A direction to the release position in a condition where the locking member 5 is in the locking position and no operation force is applied to the lever plate 7.

The first locking protrusion 7c located in this manner can serve as the shift restrictor that keeps the locking member 5 from shifting to the release position by the contact with the second locking protrusion 5e of the locking member 5 even when the locking member 5 is about to shift to the release position (in the arrow-A direction in FIG. 6) in a state where the locking member 5 is in the locking position in FIG. 6 and no operation force is applied to the lever plate 7.

In the first embodiment, as shown in FIGS. 6 to 7, the first locking protrusion 7c is at a position to define a gap "t" between the first locking protrusion 7c (in particular, a distal end 7c1 thereof) and the second locking protrusion 5e when the locking member 5 is in the locking position, so that the first locking protrusion 7c and the second locking protrusion 5e avoid always being in contact with each other.

The gap t has such a size as to maintain the locking member 5 in the locking position through the contact between the first locking protrusion 7c and the second locking protrusion 5e when the locking member 5 in the locking position shifts to the release position without receiving the operation force.

Even when the locking member 5 springs upward without an application of the operation force thereto, a distal lock tooth 5b1 (see FIG. 3) among the lock teeth 5b of the locking member 5 shifts largest. The gap t is set to a value which is very small enough to keep the distal lock tooth 5b1 from disengaging from the engaged hole 2a of the lower rail 2. From this perspective, the gap t is set to a very small value of about 0.1 mm to 1 mm.

The first rotation regulation stopper 7d is constituted by, as shown in FIG. 5, a protrusion or the like protruding upward from a top surface of the main body 7a. The first rotation regulation stopper 7d can regulate a rotation of the main body 7a at a predetermined angle by contact with a top wall 3b (FIGS. 8 to 9) of the upper rail 3 to prevent excessive rotation when the main body 7a rotates in the second direction II in the state where the locking member 5 is in the locking position. The gap t (see FIGS. 6 to 7) is realized by adjustment of the length and shape of the first locking protrusion 7c of the lever plate 7 and/or the length and shape of the second locking protrusion 5e of the locking member 5.

As shown in FIG. 5, the second rotation regulation stopper 7e is constituted by a protrusion or the like protruding obliquely upward from an end of the lever plate 7 opposite to the end provided with the first locking protrusion 7c. The second rotation regulation stopper 7e regulates the rotation of the main body 7a at a predetermined angle by contact with the top wall 3b (see FIGS. 8 to 9) of the upper rail 3 to prevent excessive rotation when the main body 7a rotates in the first direction I. Moreover, adjustment of the length and shape of the first locking protrusion 7c and/or length and shape of the locking member 5 succeeds in avoiding contact between the first locking protrusion 7c and the locking member 5. Consequently, the contact between the first locking protrusion 7c and the locking member 5 is avoidable, and bending of and damage to the first locking protrusion 7c are preventable.

As shown in FIG. 3, FIG. 5, and FIGS. 8 to 9, the operation shaft 8 in the first embodiment has a taper part 8a (guide) at a leading end thereof, and thus can easily enter the fit hole 7b of the lever plate 7 to be fitted therein.

As shown in FIG. 5 and FIGS. 8 to 9, the lever spring 12 (second urging member) is a twisted spring coil rotationally urging the main body 7a of the lever plate 7 in the second direction II, and includes a coil part 12a and a pair of ends 12b, 12c. The coil part 12a receives the operation shaft 8 inserted therein. Each of the lock spring 11 and the lever spring 12 may be made of another spring, e.g., plate spring, except twisted spring coil. Specifically, each of the lock spring 11 and the lever spring 12 may be any spring as long as the spring generates the aforementioned rotational urging force.

The operation shaft 8 has a recess 8b in which the lever spring 12 is fitted. Hence, as shown in FIGS. 8 to 9, the operation shaft 8 is inserted in the fit hole 7b of the lever plate 7 and the coil part 12a of the lever spring 12 to allow the coil part 12a to be fitted in the recess 8b of the operation shaft 8. This can prevent the operation shaft 8 from coming off the lever plate 7.

The one end 12b of the lever spring 12 is kept from shifting upward in a state of being in contact with a lower surface of the top wall 3b (see FIGS. 8 to 9) of the upper rail 3, and the other end 12c thereof extends outward from the main body 7a through a hole (not shown) formed in a side surface portion of the main body 7a of the lever plate 7 and is in contact with a bottom surface of the main body 7a from below. Alternatively, instead of the contact between the other end 12c and the bottom surface of the main body 7a, a peripheral surface of the other end 12c may come into contact with an inner surface defining a hole (not shown) formed in the side surface portion of the main body 7a. With this configuration, the lever spring 12 usually rotationally urges the lever plate 7 in the second direction II.

As shown in FIG. 1, the operation lever 4 extends in the width direction Y at a lower position of a front end of the seat S. The operation lever 4 has opposite ends each fixedly attached to the corresponding operation shaft 8 extending outward from the upper rails 3. The operator rotates the operation lever 4 upward to allow the operation shaft 8 and the lever plate 7 connected thereto to rotate in the first direction I.

In the sliding device 1 having the above-described configuration, the locking member 5 receives, as shown in FIG. 6, the rotational urging force in a direction of pushing the locking release protrusion 5d upward from the lock spring 11 (see FIG. 4), i.e., in the direction (arrow-B direction in FIG. 6) of the engagement of the lock tooth 5b of the locking member 5 with the engaged hole 2a of the lower rail 2 in a state where the lock mechanism 20 locks the upper rail 3 in a specific position as shown in FIG. 3. The locking member 5 is thus maintained in the state where the lock tooth 5b engages with the engaged hole 2a of the lower rail 2 to prevent the upper rail 3 and the seat S fixedly attached thereto from moving in the front-rear direction X.

Contrarily, the operation lever 4 is manually pulled up to release the locking of the lock mechanism 20. Owing to the operation, the operation lever 4 rotates upward to rotate the operation shaft 8 connected to the operation lever 4 and the lever plate 7 connected to the operation shaft about the second rotation axis S2 in the first direction I (see FIG. 3 and FIG. 5).

At this time, as shown in FIGS. 5 to 6, the main body 7a of the lever plate 7 pushes the locking release protrusion 5d of the locking member 5 downward. Therefore, the locking member 5 rotates in the direction (arrow-A direction in FIG. 6) of releasing the engagement of the lock tooth 5b of the locking member 5 with the engaged hole 2a of the lower rail 2 against the rotational urging force of the lock spring 11 in the locking direction (arrow-B direction in FIG. 6). As a result, the engagement of the lock tooth 5b of the locking member 5 with the engaged hole 2a of the lower rail 2 is released to allow the upper rail 3 and the seat S fixedly attached thereto to move in the front-rear direction X.

Cease of the operation of pulling up the operation lever 4 after completion of the movement of the seat S to the desired position in the front-rear direction X allows the locking member 5 to re-rotate in a clockwise direction (arrow-B direction) upon receiving the rotational urging force from the lock spring 11 in the locking direction B and reenter the state (shown in FIG. 6) where the lock tooth 5b of the locking member 5 engages with the engaged hole 2a of the lower rail 2. Consequently, the upper rail 3 and the seat S fixedly attached thereto are locked in the desired position.

In the locking state shown in FIGS. 6 to 7, the first locking protrusion 7c of the lever plate 7 is located in a locking release direction (rotation direction represented by the arrow-A direction) of the second locking protrusion 5e of the locking member 5. Hence, even when the locking member 5 is about to shift from the locking position to the release position without receiving the operation force, the first locking protrusion 7c comes into contact with the second locking protrusion 5e of the locking member 5 to keep the locking member 5 from shifting to the release position. As a result, unintended locking release is avoidable.

Characteristics of First Embodiment (1) The sliding device 1 according to the first embodiment is a device for supporting the seat S slidably in the front-rear direction X and locking the seat at a desired position in the front-rear direction X. The sliding device 1 includes: the lower rail 2 fixedly attached to a mounting surface over which the seat S is placed; the upper rail 3 having a portion to be fixedly attached to the seat S, and guided by the lower rail 2 movably in the front-rear direction X; and the lock mechanism 20 that locks the upper rail 3 to the lower rail 2. The lower rail 2 has the plurality of engaged holes 2a arrayed in a longitudinal direction thereof. The lock mechanism 20 includes: the locking member 5 (engagement member) that has the lock tooth 5b engageable with at least selected one of the engaged holes 2a of the lower rail 2, and is rotatably supported in the upper rail 3 about the first rotation axis S1 extending in the width direction Y of the seat S perpendicularly intersecting the front-rear direction X to shift between the locking position (that is the position of the locking member 5 shown in FIG. 6) to keep the upper rail 3 from moving by the engagement of the lock tooth 5b with the engaged hole 2a and the release position (that is the position where the lock tooth 5b disengages from the engaged hole 2a after the locking member 5 shown in FIG. 6 shifts in the arrow-A direction); the lock spring 11 (first urging member) that gives a rotational urging force to the locking member 5 in the arrow-B direction from the release position to the locking position in FIG. 6; and the lever plate 7 (operation member) for shifting the locking member 5 in the arrow-A direction from the locking position in FIG. 6 to the release position.

The lever plate 7 includes the first locking protrusion 7c serving as the shift restrictor that keeps the locking member 5 from shifting to the release position when the locking member 5 is in the locking position in FIG. 6 and no operation force is applied to the lever plate 7.

According to this configuration, the lock mechanism 20 that locks the upper rail 3 to the lower rail 2 includes the locking member 5 and the lever plate 7. The locking member 5 is rotatably supported in the upper rail 3 about the first rotation axis S1 to shift between the locking position to keep the upper rail 3 from moving by the engagement of the lock tooth 5b with the engaged hole 2a of the lower rail 2 and the release position to release the locking. The locking member 5 receives the rotational urging force from the lock spring 11 to the locking position to be normally held in the locking position. However, the lever plate 7 is configured to shift the locking member 5 from the locking position to the release position upon receiving the application of the operation force, resulting in achievement of the release of the locking of the locking member 5 against the rotational urging force of the lock spring 11. In this configuration, the lever plate 7 includes the first locking protrusion 7c serving as the shift restrictor that keeps the locking member 5 from shifting to the release position when the locking member 5 is in the locking position and no operation force is applied to the lever plate 7. Therefore, when the locking member 5 is in the locking position, the shift restrictor of the lever plate 7 can keep the locking member 5 from shifting to the release position. Accordingly, unintended locking release is avoidable without an excessive increase in the engagement force of the lock tooth 5b of the locking member 5.

Furthermore, as the lever plate 7 including the first locking protrusion 7c as the shift restrictor has a simple configuration, it is possible to suppress the production cost and weight increase of the sliding device 1 while avoiding unintended locking release. In other words, the number of components is reducible by integrating the lever plate 7 (operation member) for locking release operation of the locking member 5 and a member (i.e., interlocking member) for holding the locking member 5 in the locking position. Moreover, accommodation of the lever plate 7 in the upper rail 3 leads to space saving of the sliding device 1.

(2) In the sliding device 1 according to the first embodiment, as shown in FIGS. 5 to 7, the locking member 5 is rotatable in the upper rail 3 about the first rotation axis S1 extending in the width direction Y of the seat perpendicularly intersecting the front-rear direction X to shift between the locking position and the release position. The lever plate 7 includes: the main body 7a rotatably supported in the upper rail 3 about the second rotation axis S2 extending in the width direction Y and differing from the first rotation axis S1 and between the first direction I of applying the operation force to the locking member 5 and the second direction II opposite to the first direction I; and the first locking protrusion 7c (first protrusion) provided as the shift restrictor at the leading end of the main body 7a. The first locking protrusion 7c is located at a side in a shifting direction (arrow-A direction) towards the release position against the locking member 5 when the locking member 5 is in the locking position and no operation force is applied to the lever plate 7.

In this configuration, the lever plate 7 includes the first locking protrusion 7c as the shift restrictor at the leading end of the main body 7a for giving the operation force to the locking member 5. Hence, the configuration of the lever plate 7 is simple, and the main body 7a and the first locking protrusion 7c are formable into one body. As a result, it is possible to further suppress the production cost and weight increase of the sliding device 1. Furthermore, as the first locking protrusion 7c of the lever plate 7 is located at a side in a shifting direction towards the release position against the locking member 5 when the locking member 5 is in the locking position, even when the locking member 5 is about to shift from the locking position to the release position without receiving the operation force, the first locking protrusion 7c comes into contact with the locking member 5 to keep the locking member from shifting to the release position.

(3) In the sliding device 1 according to the first embodiment, as shown in FIG. 4, and FIGS. 6 to 7, the locking member 5 includes the second locking protrusion 5e (second protrusion) located at a position to come into contact with the first locking protrusion 7c when the locking member 5 shifts in the arrow-A direction to the release position without receiving an operation force in the condition where the locking member is in the locking position and no operation force is applied to the lever plate 7.

In this configuration, when the locking member 5 is about to shift to the release position without receiving the operation force, the second locking protrusion 5e of the locking member 5 comes into contact with the first locking protrusion 7c of the lever plate 7, and hence the locking member 5 is kept from shifting to the release position. Thus, with the simple configuration, unintended locking release is reliably avoidable.

(4) In the sliding device 1 according to the first embodiment, as shown in FIGS. 6 to 7, the first locking protrusion 7c is at a position to define the gap t between the first locking protrusion 7c and the second locking protrusion 5e when the locking member 5 is in the locking position and no operation force is applied to the lever plate 7.

The gap t has such a size as to maintain the locking member 5 in the locking position through the contact between the first locking protrusion 7c and the second locking protrusion 5e when the locking member 5 in the locking position shifts to the release position without receiving the operation force.

This configuration can prevent the first locking protrusion 7c and the second locking protrusion 5e from always being in contact with each other to deteriorate by spacing the protrusions 7c, 5e from each other at the gap t therebetween when the locking member 5 is in the locking position. By contrast, when the locking member 5 is about to shift to the release position without receiving the operation force, the second locking protrusion 5e moves only at a distance corresponding to the gap t and comes into contact with the first locking protrusion 7c, and hence the locking member 5 is kept from shifting to the release position. Accordingly, unintended locking release is reliably avoidable.

(5) In the sliding device 1 according to the first embodiment, as shown in FIG. 7, the lever plate 7 includes the first rotation regulation stopper 7d that regulates a rotation of the main body 7a at a predetermined angle to prevent excessive rotation when the main body 7a rotates in the second direction II in the state where the locking member 5 is in the locking position. Moreover, the gap t is realized by adjustment of the length and shape of the first locking protrusion 7c of the lever plate 7 and/or the length and shape of the second locking protrusion 5e of the locking member 5.

In this configuration, the first rotation regulation stopper 7d prevents excessive rotation of the lever plate 7 when the main body 7a of the lever plate 7 rotates in the second direction II opposite to the first direction I of applying the operation force to the locking member 5. Moreover, the adjustment of the length and shape of the first locking protrusion 7c of the lever plate 7 and/or the length and shape of the second locking protrusion 5e of the locking member 5 succeeds in reliable suspension of the lever plate 7 in the position to define the gap t.

(6) In the sliding device 1 according to the first embodiment, as shown in FIG. 5, the lever plate 7 includes the second rotation regulation stopper 7e that regulates the rotation of the main body 7a at a predetermined rotation angle to prevent excessive rotation when the main body 7a rotates in the first direction I.

This configuration prevents excessive rotation of the lever plate 7 when the main body 7a of the lever plate 7 rotates in the first direction I of applying the operation force to the locking member 5. Moreover, the adjustment of the length and shape of the first locking protrusion 7c and/or the length and shape of the locking member 5 succeeds in avoiding the contact between the first locking protrusion 7c and the locking member 5. This can prevent bending of or damage to the first locking protrusion 7c of the lever plate 7.

(7) The sliding device 1 according to the first embodiment includes, as shown in FIG. 3, FIG. 5, and FIGS. 8 to 9, the operation shaft 8 extending along the second rotation axis S2 and being rotatable about the second rotation axis S2 together with the lever plate 7. The main body 7a has the fit hole 7b for receiving the operation shaft 8 to be fitted therein. The operation shaft 8 is fitted in the fit hole 7b to be connected to the main body 7a. The operation shaft 8 has the taper part 8a (guide) at the leading end thereof.

In this configuration including the operation shaft 8 rotatable together with the lever plate 7, the operation shaft 8 is fitted in the fit hole 7b of the main body 7a of the lever plate 7 to be connected to the main body 7a. The operation shaft 8 has the taper part 8a at the leading end thereof, and thus the operation shaft 8 is smoothly insertable into the fit hole 7b of the main body 7a without being caught by an edge defining the fit hole 7b at the insertion. Accordingly, assembly workability of the sliding device 1 improves.

(8) The sliding device 1 according to the first embodiment includes, as shown in FIGS. 8 to 9, the lever spring 12 (second urging member) that rotationally urges the main body 7a of the lever plate 7 in the second direction II. The operation shaft 8 has the recess 8b in which the lever spring 12 is fitted to keep the operation shaft 8 and the lever spring 12 from shifting relative to each other in the longitudinal direction of the operation shaft 8.

The configuration in the first embodiment further includes the lever spring 12 that rotationally urges the main body 7a of the lever plate 7 in the second direction II opposite to the first direction I of applying the operation force to the locking member 5 by the main body 7a of the lever plate 7. In this configuration, the operation shaft 8 has the recess 8b in which the lever spring 12 is fitted to keep the operation shaft 8 and the lever spring 12 from shifting relative to each other in the longitudinal direction of the operation shaft 8. The lever spring 12 is fitted in the recess 8b of the operation shaft 8 so that the lever spring 12 serves as a retainer to prevent the operation shaft 8 from coming off the fit hole 7b of the main body 7a.

The lever spring 12 is not an indispensable structural element of the sliding device according to the present invention, and hence, the operational effects based on characteristics (1) to (7) described above in the first embodiment are attainable even without the lever spring 12.

Modifications of First Embodiment (A) Although the gap t is defined between the first locking protrusion 7c (first protrusion) of the lever plate 7 and the second locking protrusion 5e of the locking member 5 to prevent the deterioration of the first locking protrusion 7c in the first embodiment, the present invention is not limited thereto.

One modification of the present invention includes another way of preventing deterioration of the first locking protrusion 7c (first protrusion). Specifically, an elastic member may be disposed between the protrusions 7c, 5e or making one of the protrusions 7c, 5e with soft material, such as, resin or the like, instead of defining the gap t therebetween.

(B) Although the locking member 5 includes the second locking protrusion 5e (second protrusion) in the first embodiment, the present invention is not limited thereto. In another modification of the present invention, the locking member 5 may include, in place of the second locking protrusion 5e (second protrusion), another portion (e.g., slope surface portion) or another component (screw or plate) to come into contact with the first locking protrusion 7c when the locking member 5 in the locking position shifts in the arrow-A direction to the release position without receiving the operation force.

Second Embodiment

Figure 13:
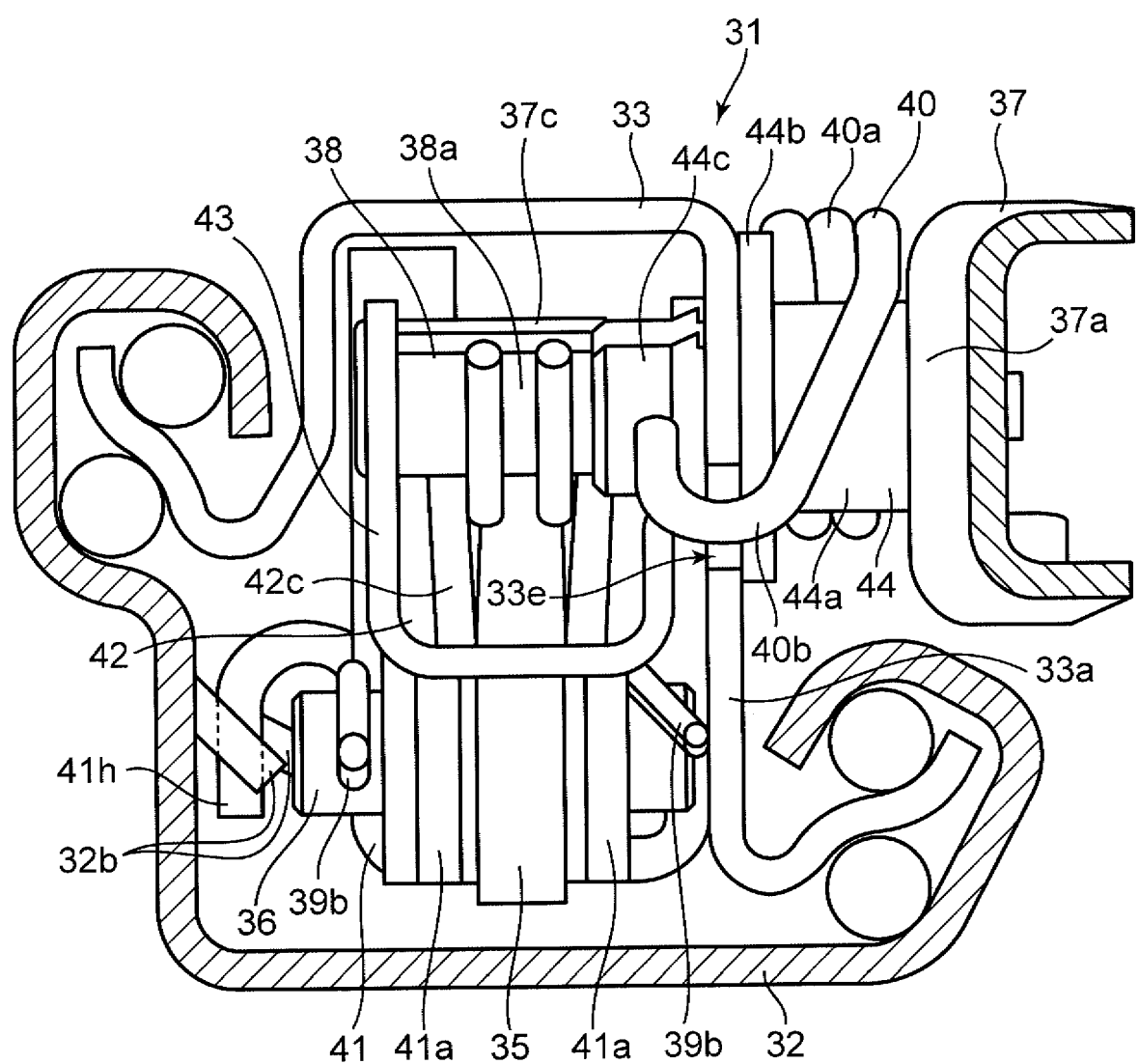
FIG. 13 is a view of an assembly of the sliding device shown in FIG. 10 when seen in a direction denoted by arrow P.
Figure 14:
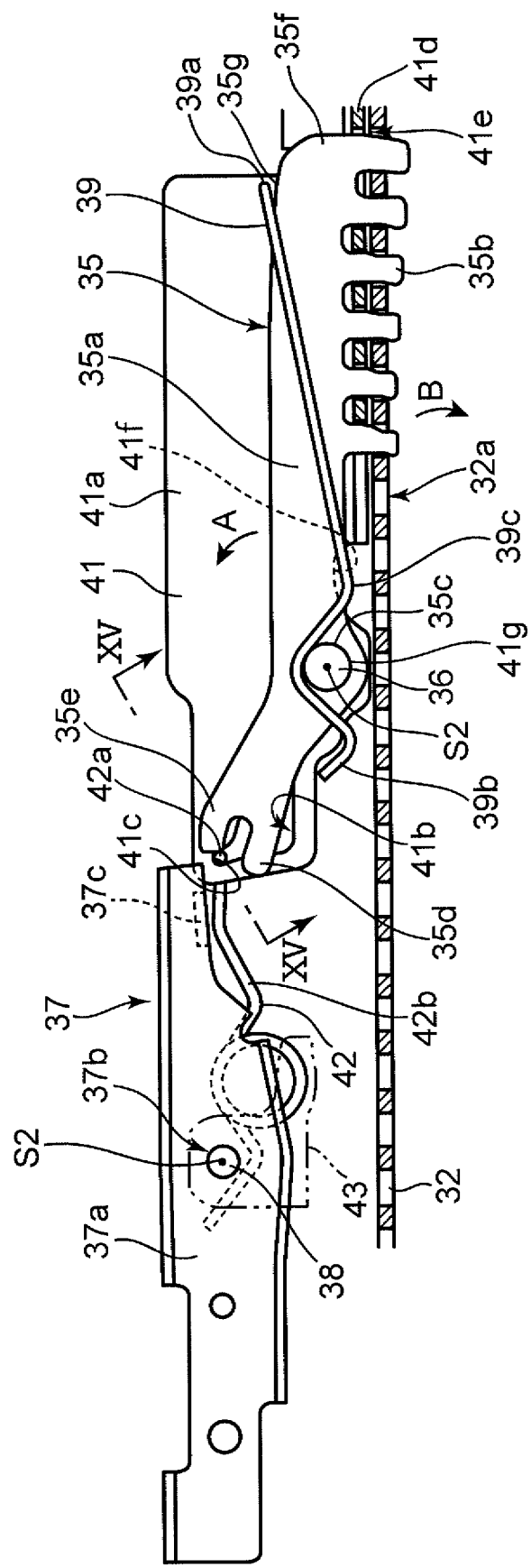
FIG. 14 is a cross-sectional explanatory view showing a state where the locking member shown in FIG. 10 is in a locking position.
Figure 15:
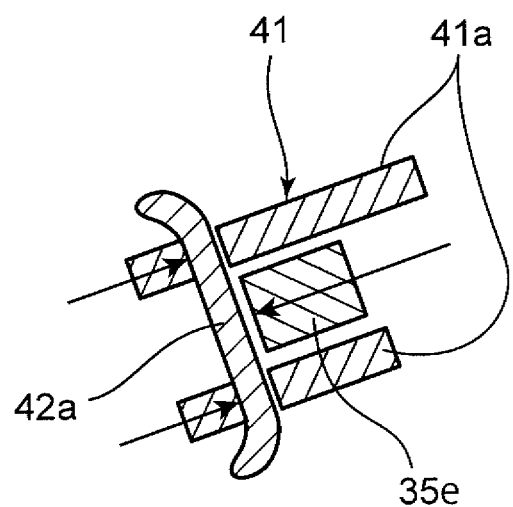
FIG. 15 is a cross-sectional view taken along the line XV-XV in FIG. 14.
Figure 16:
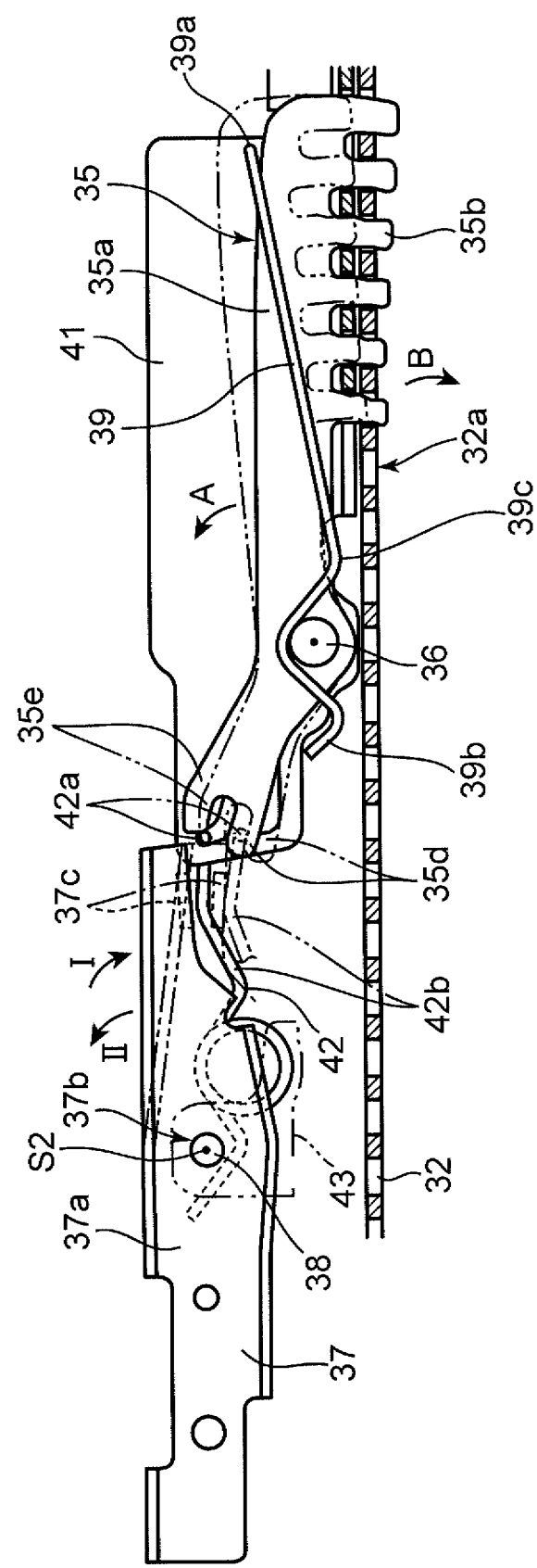
FIG. 16 is a cross-sectional explanatory view showing shifting of the locking member shown in FIG. 14 from the locking position to a release position.

As shown in FIGS. 14 and 16, a sliding device 31 according to the second embodiment significantly differs from the sliding device 1 according to the first embodiment in that a contact part 42a included in a stopper spring 42 is held and positioned in a state of being pressed to an upper end corner 41c of an opening 41b in the support bracket 41. Furthermore, as shown in FIGS. 10 to 15, the sliding device 31 according to the second embodiment significantly differs from the sliding device 1 according to the first embodiment in including the stopper spring 42 independently of a lever bracket 37, as the shift restrictor that keeps a locking member 35 included in a lock mechanism 50 from shifting to a locking position.

Figure 10:
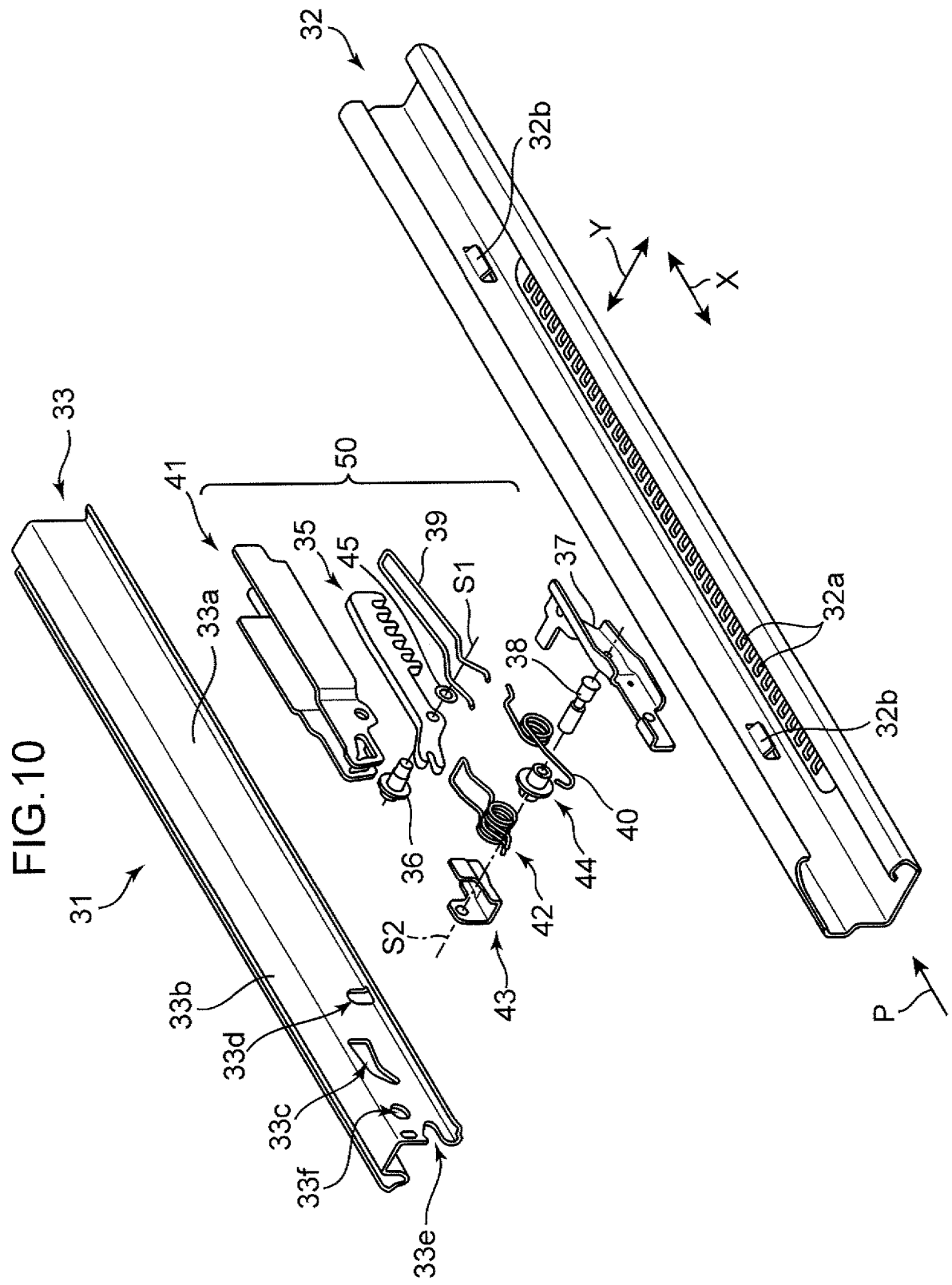
FIG. 10 is an exploded perspective view of a sliding device according to a second embodiment of the present invention.
Figure 11:
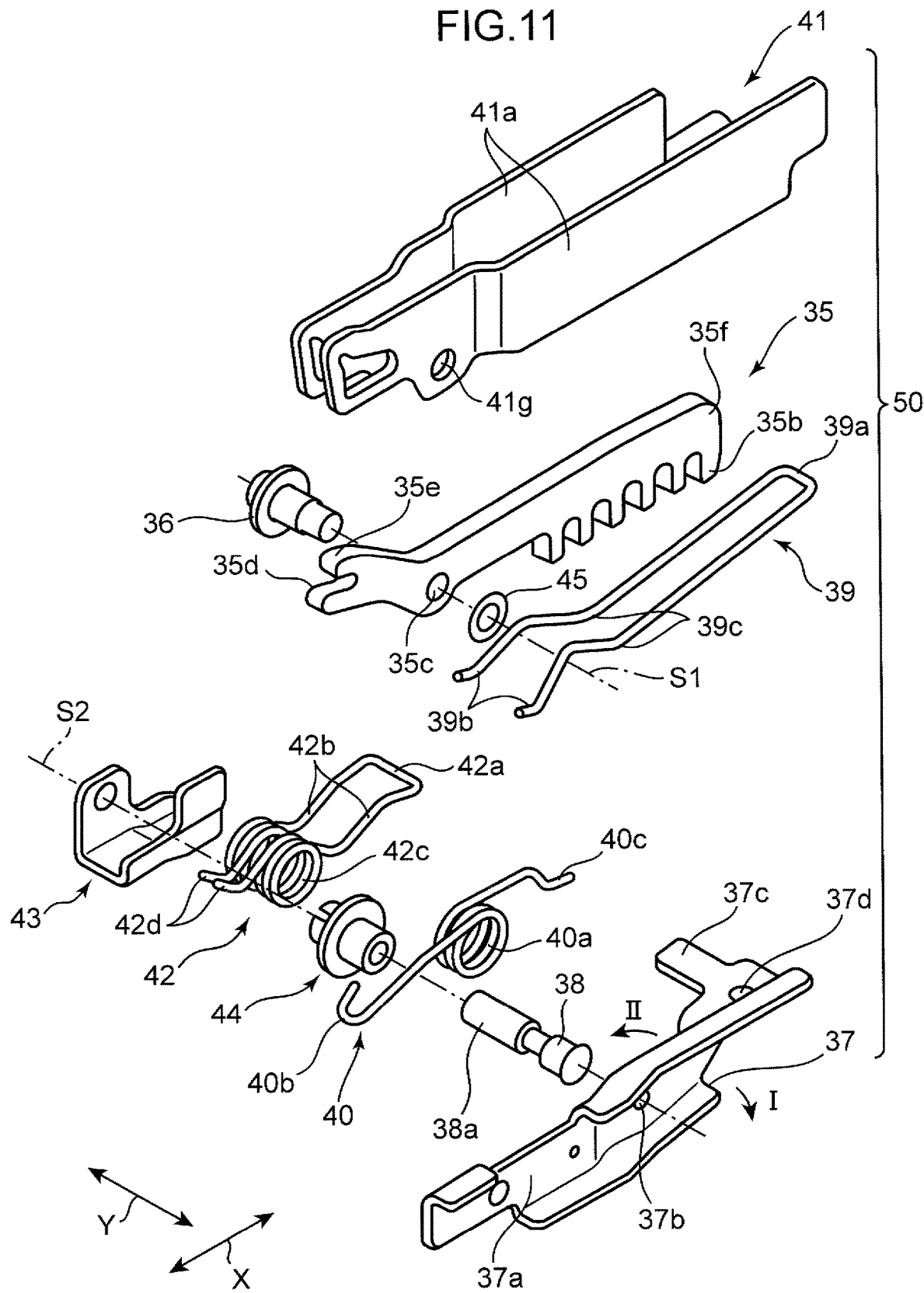
FIG. 11 is an exploded perspective view of a lock mechanism shown in FIG. 10.
Figure 12:
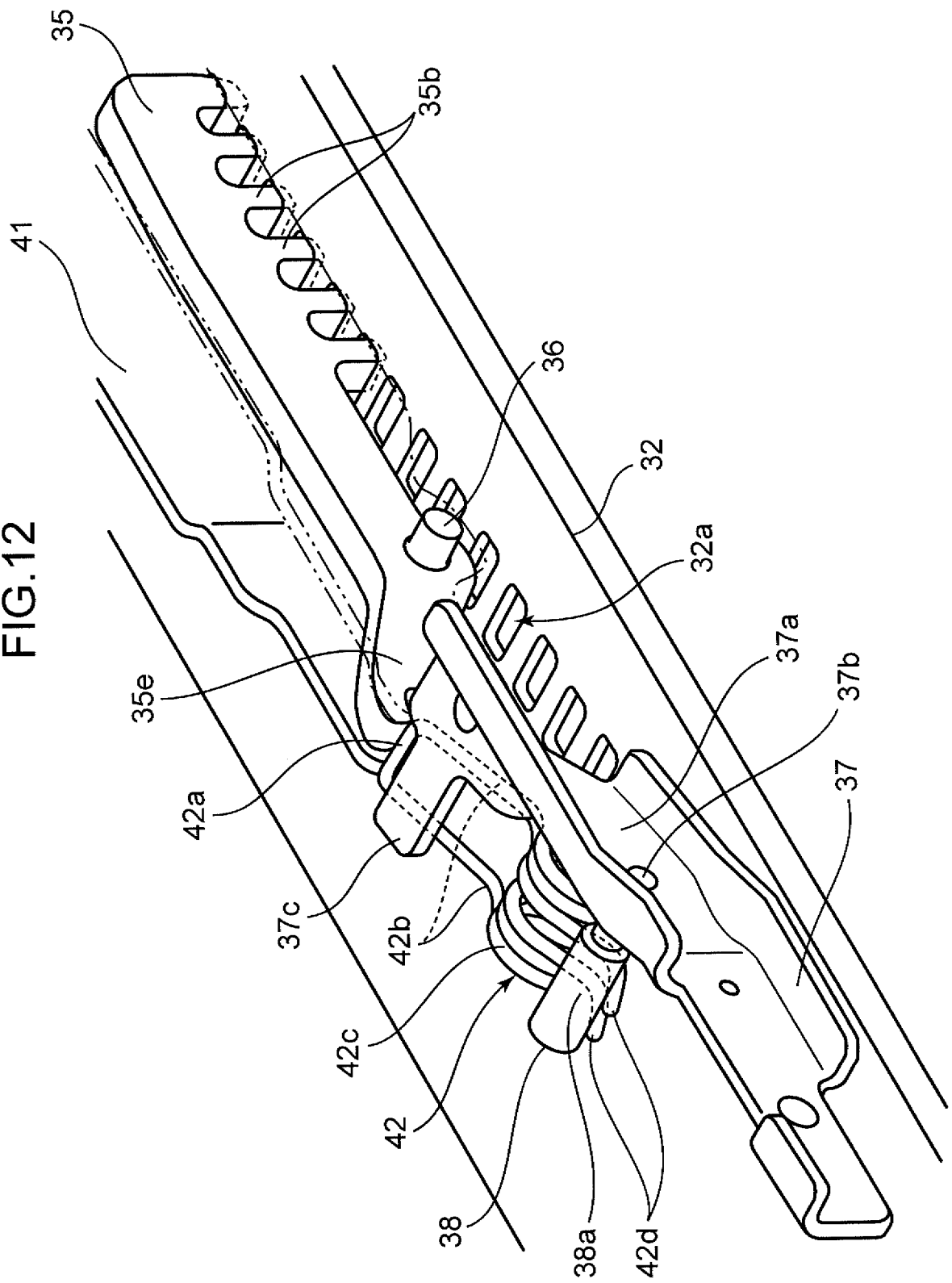
FIG. 12 is an enlarged perspective view showing a stopper spring, and therearound, including a contact part contactable with a locking member in a locking position in an upper rail shown in FIG. 10.

Specifically, the sliding device 31 includes, as shown in FIG. 10, a pair of lower rails 32; a pair of upper rails 33: the lock mechanism 50 provided in each of the upper rails 33 to lock the sliding of the upper rail 33; and an operation lever (nor shown) for releasing the locking of the lock mechanism 50, in the same manner as the sliding device 1 shown in FIG. 1.

The configuration of the lower rails 32 and the configuration of the upper rails 33 are basically equivalent to the configuration of the lower rails 2 and the configuration the upper rails 3 of the sliding device 1 in FIG. 1, respectively. Specifically, the pair of lower rails 32 are fixedly attached to a floor surface in a front-rear direction X at a distance therebetween. Each lower rail 32 has a bottom surface formed with a plurality of engaged holes 32a (engaged parts). The engaged holes 32a are arrayed at regular intervals in a longitudinal direction (i.e., the front-rear direction X) of the lower rail 32. Each upper rail 33 is guided by the corresponding lower rail 32 movably in the front-rear direction X. Moreover, as shown in FIG. 10 and FIG. 13, the lower rail 32 has a pair of stoppers 32b in the front-rear direction at a distance therebetween. The stoppers 32 receive respective protrusions 41h provided on lateral positions of a below-described support bracket 41 to come into contact therewith for restricting a movement range of the upper rail 33.

The lock mechanism 50 is configured to lock the upper rail 33 to the lower rail 32 as shown in FIGS. 10 to 15. The lock mechanism 50 specifically includes: the locking member 35 (engagement member); a first support shaft 36 that rotatably supports the locking member 35; a lever bracket 37 (operation member); a second support shaft 38 that rotatably supports the lever bracket 37; a lock spring 39 (first urging member) that urges the locking member 35 in a locking direction (direction of engagement with the engaged hole 32a of the lower rail 32); a lever spring 40 (second urging member) that rotationally urges the lever bracket 37 in a direction away from the locking member 35; the support bracket 41 accommodating the locking member 35 and supporting opposite ends of the first support shaft 36; the stopper spring 42 having the contact part 42a; a bracket 43 accommodating the stopper spring 42; a resin bush 44; and a washer 45.

Specifically, the locking member 35 has a plurality of lock teeth 35b protruding downward at a lower end thereof ranging from a leading end of a main body 35a of the locking member to about the center thereof. Each of the lock teeth 35b serves as an engaging part engageable with at least selected one of the engaged holes 32a of the lower rail 32.

The locking member 35 has an axial hole 35c for receiving the first support shaft 36 to be inserted therein. The locking member 35 is arranged together with the washer 45 in a space defined between a pair of facing walls 41a of the support bracket 41, rotatable about the first support shaft 36 inserted in the axial hole 35c, and supported by the first support shaft 36. The first support shaft 36 passes through respective through holes 41g of the facing walls 41a of the support bracket 41 in such a way as to extend along a first rotation axis S1 extending in a width direction Y of a seat S (see FIG. 1). As shown in FIG. 14, the lock teeth 35b of the locking member 35 protrude downward of the support bracket 41 via through holes 41e formed in a bottom wall 41d of the support bracket 41.

The locking member 35 rotatably supported by the first support shaft 36 in this way is rotatable in the upper rail 33 about the first rotation axis S1 to shift between a locking position (that is the position of the locking member 35 in FIG. 14) to keep the upper rail 33 from moving by the engagement of the lock tooth 35b with the engaged hole 32a and a release position (that is the position where the lock tooth 35b disengages from the engaged hole 32a after the locking member 35 in FIG. 16 shifts in an arrow-A direction) to release the locking.

Besides, the locking member 35 includes a locking release protrusion 35d located opposite the lock tooth 35b across the axial hole 35c in which the first support shaft 36 is inserted. The locking release protrusion 35d receives an operation force from a pressing part 37c included in the lever bracket 37 via the contact part 42a of the stopper spring 42 to rotate in a locking release direction (arrow-A direction in FIG. 14 and FIG. 16) of releasing the engagement of the lock tooth 35b with the engaged hole 32a. Moreover, the locking member 35 further includes a contact protrusion 35e extending upward above the axial hole 35c at a distance from the locking release protrusion 35d.

The lock spring member 39 gives an urging force to the locking member 35 in a direction from the release position to the locking position shown in FIG. 14. Specifically, the lock spring 39 is made of spring having an U-shape to give a rotational urging force to the locking member 35 in the locking direction of the engagement of the lock tooth 35b with the engaged hole 32a.

The lock spring 39 has a connection part 39a bent in the U-shape and the connection part 39a is engaged with an upper side section 35g of a leading end 35f of the locking member 35 in such a way as to lean against the upper side section. The lock spring 39 has opposite ends 39b one of which is in contact with a side wall 33a (see FIG. 13) of the upper rail 33. The lock spring 39 further has a lower bending part 39c located between the connection part 39a and each of the opposite ends 39b thereof and the lower bending part 39c is engaged with a lower end 41f (see FIG. 14) of the support bracket 41. Besides, the lock spring 39 gives a rotational urging force, by using its elastic force, in a direction (arrow-B direction in FIG. 14 and FIG. 16) of pushing the leading end 35f of the locking member 35 downward from the connection part 39a. The lock spring 39 can give the rotational urging force to the locking member 35 in the direction (arrow-B direction in FIG. 14 and FIG. 16) of the engagement of the lock tooth 35b with the engaged hole 32a.

In the structure shown in FIGS. 10 to 15, the connection part 39a of the lock spring 39 is accommodated in the space between the facing walls 41a of the support bracket 41 together with the locking member 35.

The lever bracket 37 is a member for shifting the locking member 35 in the arrow-A direction from the locking position in FIG. 14 to the release position upon receiving an application of an operation force, and specifically, includes a main body 37a having a fit hole 37b, and the pressing part 37c. The main body 37a of the lever bracket 37 is arranged outside the side wall 33a of the upper rail 33.

The main body 37a has a slender plate shape and has the fit hole 37b. The fit hole 37b receives an end of the second support shaft 38 inserted therein. The lever bracket 37 is thus rotatably supported by the second support shaft 38 at an outer surface of the side wall 33a of the upper rail 33. The second support shaft 38 extends along a second rotation axis S2, is rotatable about the second rotation axis S2, and penetrates the side wall 33a of the upper rail 33. Therefore, the main body 37a is rotatably supported outside the upper rail 33 about the second rotation axis S2 and between a first direction I of applying the operation force to the locking member 35 and a second direction II opposite to the first direction I.

In the second embodiment, as shown in FIG. 10 and FIG. 13, the main body 37a of the lever bracket 37 is rotatably attached to the side wall 33a of the upper rail 33 via the resin bush 44 at a distance to the side wall. The resin bush 44 has a cylindrical shape for receiving the second support shaft 38 to be inserted therein, and includes, as shown in FIG. 13, a main body 44a having a cylindrical shape, a flange 44b coming into contact with the side wall 33a, and an insertion end 44c to be inserted in the upper rail 33 through a through hole 33f (see FIG. 10) of the side wall 33a.

The main body 37a is connected to an unillustrated operation lever. Operation of the operation lever enables the lever bracket 37 to rotate in the first direction I.

The pressing part 37c extends from the leading end of the main body 37a in a direction (width direction Y in FIG. 11) in which the second rotation axis S2 extends. Specifically, the pressing part 37c extends in a direction perpendicularly intersecting an extension direction of the main body 37a and inserted in an opening 33c in the side wall 33a of the upper rail 33 shown in FIG. 10 to reach the inside of the upper rail 33. The pressing part 37c has a thin-plate shape.

As shown in FIG. 14, the pressing part 37c is located above and apart from arm parts 42b of the stopper spring 42 when the locking member 35 is in the locking position and no operation force is applied to the lever bracket 37.

The stopper spring 42 is a spring coil, specifically, includes: the contact part 42a extending in the width direction Y of the seat S (see FIG. 1); a pair of arm parts 42b connected to the opposite ends of the contact part 42a; a coil part 42c (urging part); and a pair of rear ends 42d. The rear ends 42d are engaged with a cylindrical part 38a (FIGS. 11 to 13) at a leading end of the second support shaft 38.

The contact part 42a is located to pass through the opening 41b (see FIG. 14 and FIG. 15) formed in each of the facing walls 41a of the support bracket 41. The coil part 42c usually urges the contact part 42a upward via the arm parts 42b. Hence, the contact part 42a is held in a state of being pressed to the upper end corner 41c of the opening 41b in the support bracket 41 when the lever bracket 37 receives no operation force. The upper end corner 41c is tapered upward, and can reliably hold the contact part 42a in a state of receiving the contact part fitted therein.

In this state, as shown in FIG. 14, the contact part 42a is at a contact position to come into contact with the locking member 35 (specifically, the contact protrusion 35e) in a shifting direction (arrow-A direction in FIG. 14) of the locking member to the release position when the locking member 35 is in the locking position and no operation force is applied to the lever bracket 37.

The contact part 42a is located at the contact position shown in FIG. 14 as described above. In this arrangement, the contact part 42a comes into contact with the contact protrusion 35e of the locking member 35 even when the locking member 35 is about to shift to the release position (i.e., shift in the arrow-A direction in FIG. 14) in a state where the locking member 35 is in the locking position in FIG. 14 and no operation force is applied to the lever bracket 37. Accordingly, the stopper spring 42 can serve as the shift restrictor that keeps the locking member 35 from shifting to the release position.

Moreover, the upper end corner 41c of the opening 41b in the support bracket 41 serves as the holding part that is engaged with the both ends of the contact part 42a to hold the contact part 42a at a contact position when the contact part 42a is at the below-described contact position shown in FIG. 14.

The coil part 42c and the pair of rear ends 42d of the stopper spring 42 are accommodated in a U-shaped portion of the bracket 43.

The lever spring 40 (second urging member) is a twisted spring coil that rotationally urges the main body 37a of the lever bracket 37 in the second direction II, and includes a coil part 40a and a pair of ends 40b, 40c. The lever spring 40 is arranged outside the side wall 33a of the upper rail 33 together with the main body 37a of the lever bracket 37.

The one end 40b of the lever spring 40 is kept from shifting upward in a state of engaging with an end notch 33e (see FIG. 10 and FIG. 13) in the side wall 33a of the upper rail 33, and the other end 40c thereof is inserted, from above, through a through hole 37d (see FIG. 11) at a proximal end of the pressing part 37c of the lever bracket 37 to come into contact with a lower surface of the proximal end. With this configuration, the lever spring 40 usually rotationally urges the lever bracket 37 in the second direction II.

In the sliding device 31 having the above-described configuration, the locking member 35 receives, as shown in FIG. 14, the rotational urging force from the lock spring 39 in a direction of pushing the leading end 35f downward, i.e., in the direction (arrow-B direction in FIG. 14) of the engagement of the lock tooth 35b of the locking member 35 with the engaged hole 32a of the lower rail 32, in a state where the lock mechanism 50 locks the upper rail 33 shown in FIG. 10 in a specific position. This maintains the state of the engagement of the lock tooth 35b of the locking member 35 with the engaged hole 32a of the lower rail 32, and prevents the upper rail 33 and the seat S (see FIG. 1) fixedly attached thereto from moving in the front-rear direction X.

Contrarily, an unillustrated operation lever is manually pulled up to release the locking of the lock mechanism 50. Owing to the operation, the operation lever rotates upward to rotate the lever bracket 37 connected to the operation lever about the second rotation axis S2 in the first direction I (see FIG. 14 and FIG. 16).

At this time, as shown in FIG. 16, the pressing part 37c of the lever bracket 37 presses the locking release protrusion 35d of the locking member 35 downward via the arm parts 42b and the contact part 42a of the stopper spring 42. The locking member 35 rotates in the direction (arrow-A direction in FIG. 14 and FIG. 16) of releasing the engagement of the lock tooth 35h of the locking member 35 with the engaged hole 32a of the lower rail 32 against the rotational urging force of the lock spring 39 in the locking direction (arrow-B direction in FIG. 14 and FIG. 16). As a result, the engagement of the lock tooth 35b of the locking member 35 with the engaged hole 32a of the lower rail 32 is released to allow the upper rail 33 and the seat S (see FIG. 1) fixedly attached thereto to move in the front-rear direction X.

Cease of the operation of pulling up the unillustrated operation lever after completion of the movement of the seat S to the desired position in the front-rear direction X allows the locking member 35 to re-rotate in a clockwise direction (arrow-B direction) upon receiving the rotational urging force from the lock spring 39 in the locking direction (arrow-B direction) and reenter the state (shown in FIG. 14) where the lock tooth 35b of the locking member 35 engages with the engaged hole 32a of the lower rail 32. Consequently, the upper rail 33 and the seat S fixedly attached thereto are locked at the desired position.

In the locking state shown in FIG. 14, as the contact part 42a of the stopper spring 42 is located in a locking release direction (rotation direction corresponding to the arrow-A direction) of the contact protrusion 35e of the locking member 35, even when the locking member 35 is about to shift from the locking position to the release position without receiving the operation force, the contact part 42a comes into contact with the contact protrusion 35e of the locking member 35, and further the opposite ends of the contact part 42a is pressed to and engage with the upper end corner 41c (holding part in the present invention) of the opening 41b in the support bracket 41. This succeeds in keeping the locking member 35 from shifting to the release position while suppressing variations in the position of the contact part 42a attributed to differences in a shaft diameter of the second support shaft 38. As a result, unintended locking release is avoidable.

Characteristics of Second Embodiment (1) As shown in FIGS. 14, 16, the sliding device 31 according to the second embodiment has prominent characteristics in that the contact part 42a of the stopper spring 42 is held and positioned in the state of being pressed to the upper end corner 41c of the opening 41b in the support bracket 41.

Specifically, in the sliding device 31 according to the second embodiment, the contact part 42a has a shape extending in the width direction Y of the seat S. The sliding device 31 includes the support bracket 41 having the upper end corner 41c serving as the holding part that is engaged with the opposite ends of the contact part 42a in the width direction Y of the seat S to hold the contact part 42a at the contact position when the contact part 42a is at the contact position.

In this configuration, the upper end corner 41c can reliably hold the contact part 42a at the contact position by being engaged with the both ends of the contact part 42a in the width direction Y of the seat S when the contact part 42a is at the contact position. Besides, the upper end corner 41c is engaged with the both ends of the contact part 42a to achieve the positioning of the contact part 42a at the contact position while suppressing the variations.

In particular, when the coil part 42c of the stopper spring 42 urges the contact part 42a from the retract position to the contact position, the contact part 42a receives both the urging force from the coil part 42c and an engagement force from the upper end corner 41c as acting to the both ends of the contact part 42a in a direction opposite to the urging force. Consequently, the contact part 42a is more reliably holdable at the contact position. Here, the retract position means a position of the contact part 42*a* having retracted away from the moving in the direction (arrow-A direction) of the locking member 35 to the release position (i.e., position of the contact part 42*a* denoted by the long dashed double-short dashed line in FIG. 16) at a destination of the contact part 42*a* to allow the locking member 35 to shift from the locking position to the release position.

As described above, the support bracket 41 holds the contact part 42*a* at the contact position. With this configuration, the support bracket 41 gives a force to the contact protrusion 35*e* via the contact part 42*a* in a direction of avoiding release of the locking at the time of the locking of the locking member 35 even when the locking member 35 is about to shift in the direction (arrow-A direction in FIG. 14 and FIG. 16) of releasing the engagement. Accordingly, the locking member 35 having received the counterforce from the support bracket 41 is hindered from rotating in the locking release direction.

For instance, in the sliding device 31 according to the second embodiment, the shaft diameter of the second support shaft 38 is smaller than a hole diameter of an axial hole (e.g., the fit hole 37*b* of the lever bracket 37 or a fit hole of the bracket 43) for receiving the second support shaft 38 inserted therein to achieve a smooth axial rotation. Hence, a very small gap comes into existence between the shaft (second support shaft 38) and the axial hole (axial hole for receiving the second support shaft 38 inserted therein). There may be a possibility that variations in the position of the contact part 42*a* occurs depending on the size of the gap, which may lead to differences in operability of avoiding unintended locking release (locking release avoidance operability). However, in the sliding device 31 according to the second embodiment, the upper end corner 41*c* positions the contact part 42*a* while suppressing the variations. This succeeds in reducing the possibility of the differences in the locking release avoidance operability due to the influence of the gap between the second support shaft 38 and the axial hole. In other words, the support bracket 41 receives the contact part 42*a* at the inter locking of holding the locking member 35 in the locking position to thereby achieve reduction in the differences in the locking release avoidance operability.

That is to say, in the second embodiment, the contact part 42*a* engages with the support bracket 41 to be held in a locking state of the locking member 35. This achieves suppression of the variations in the position of the contact part 42*a*, and reduction in the differences in the locking release avoidance operability attributed to the differences in the rotation shaft of the lever bracket 37.

(2) In the sliding device 31 according to the second embodiment, the lever bracket 37 includes the pressing part 37*c* provided on the main body 37*a* for pressing the locking member 35 in the direction of shifting to the release position when the main body 37*a* rotates in the first direction I.

The stopper spring 42 serving as the shift restrictor has the contact part 42*a* contactable with the locking member 35. The contact part 42*a* is at the contact position to come into contact with the locking member 35 in the shifting direction (arrow-A direction in FIG. 14) of the locking member to the release position when the locking member 35 is in the locking position and no operation force is applied to the lever bracket 37. Contrarily, when the lever bracket 37 rotates in the first direction I, the pressing part 37*c* presses the contact part 42*a* with the locking member 35 to shift the contact part 42*a* from the contact position to the retract position.

According to the configuration, the stopper spring 42 has the contact part 42*a* contactable with the locking member 35. The contact part 42*a* is at the contact position to come into contact with the locking member 35 in the shifting direction of the locking member to the release position when the locking member 35 is in the locking position and no operation force is input to the lever bracket 37. Therefore, even when the locking member 35 is about to shift to the release position, the locking member 35 can be kept from shifting to the release position by the contact with the contact part 42*a* in the state where the locking member 35 is in the locking position. Accordingly, unintended locking release is avoidable without an excessive increase in the engagement force of the lock tooth 35*b* serving as the engaging part of the locking member 35. Contrarily, when the lever bracket 37 rotates in the first direction I, the pressing part 37*c* presses the contact part 42*a* with the locking member 35 to move the contact part 42*a* from the contact position to the retract position, and can reliably release shift restriction of the locking member 35. Consequently, when the lever bracket 37 rotates in the first direction I, the pressing part 37*c* allows the locking member 35 to reliably shift to the release position with its pressing force to the locking member 35.

The sliding device 31 according to the second embodiment can reliably avoid unintended locking release of the locking member 35 by the following two kinds of avoidance operability: the first avoidance operability that the contact part 42*a* of the stopper spring 42 being in contact with the locking member 35 is pressed to and held by the upper end corner 41*c* of the opening 41*b* in the support bracket 41, as described in item (1) above; and the second avoidance operability that the contact part 42*a* comes into contact with the locking member 35.

(3) In the sliding device 31 according to the second embodiment, the stopper spring 42 further includes the coil part 42*c* serving as an urging part that urges the contact part 42*a* from the retract position to the contact position.

In this configuration, the coil part 42*c* urges the contact part 42*a* upward from the retract position to the contact position. Therefore, the contact part 42*a* is reliably maintained at the contact position in the state where no operation force is applied to the lever bracket 37, i.e., in the state where the pressing part 37*c* does not press the contact part 42*a*.

(4) In the sliding device 31 according to the second embodiment, the contact part 42*a* and the coil part 42*c* are formed into the single stopper spring 42.

This configuration achieves a decrease in the number of components structuring the stopper spring 42, and reduction in each of the size and the production cost of the sliding device 31.

The contact part 42*a* may not be a part of the stopper spring 42, but may be a member independent of the stopper spring 42. Moreover, another way or component (a rotary motor or a driving device, such as a linear actuator) may be adopted in place of the stopper spring 42 to move the contact part 42*a* between the contact position and the retract position.

(5) In the sliding device 31 according to the second embodiment, the contact part 42*a* is disposed between the pressing part 37*e* and the locking member 35 to allow the pressing part 37*c* to press the locking member 35 to the release position via the contact part 42*a* when the lever bracket 37 rotates in the first direction I.

In this configuration, the pressing part 37*c* presses the contact part 42*a* and further presses the locking member 35 to the release position via the contact part 42*a* to allow the locking member to shift to the release position when the lever bracket 37 rotates in the first direction I. Thus, the pressing part 37c can press the locking member 35 by using its pressing force to the contact part 42a. This establishes a single route of transmitting the pressing force, and therefore dispersion of the force is suppressible. As a result, the operation force to the lever bracket 37 is reducible.

(6) In the sliding device 31 according to the second embodiment, the locking member 35 includes the contact protrusion 35e located at a position to come into contact with the contact part 42a when the locking member shifts to the release position in the condition where the locking member 35 is in the locking position and no operation force is applied to the lever bracket 37.

In this configuration, even when the locking member 35 is about to shift to the release position without receiving the operation force, the contact protrusion 35e of the locking member 35 comes into contact with the contact part 42a of the stopper spring 42 to keep the locking member 35 from shifting to the release position. With the simple configuration, unintended locking release is reliably avoidable.

Figure 17:
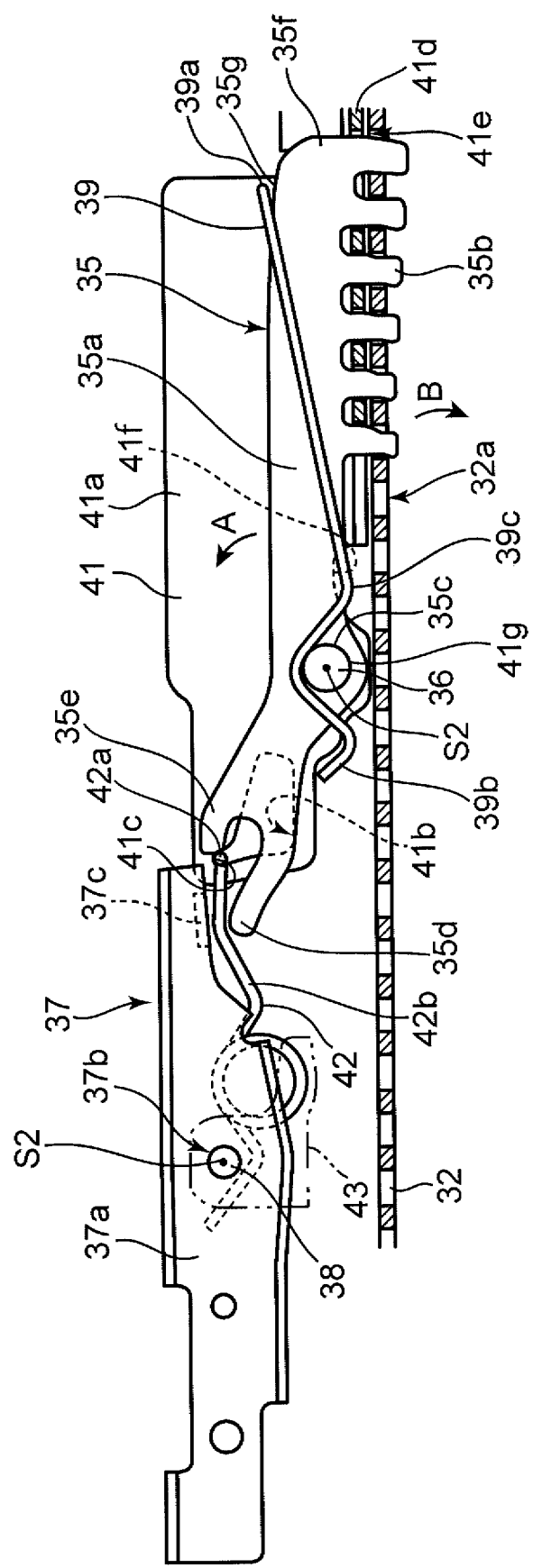
FIG. 17 is a cross-sectional explanatory view of a sliding device according to a modification of the second embodiment of the present invention, including a locking member having an extended locking release protrusion.

Modifications of Second Embodiment (A) A modification of the second embodiment as shown in FIG. 17 represents a sliding device 31 including a locking member 35 having an extended locking release protrusion 35d. The extended locking release protrusion 35d is directly contactable with a pressing part 37c of a lever bracket 37 (configured to move downward in a locking release operation) through a space defined between a pair of arm parts 42b (see FIGS. 11 to 12) of a stopper spring 42.

In other words, the locking member 35 (engagement member) includes the locking release protrusion 35d (contacted part) extending to a position to come into direct contact with the pressing part 37c without coming into contact with the arm parts 42b of the stopper spring 42 (shift restrictor) when the locking member 35 is in the locking position and an operation force is applied to the lever bracket 37 (operation member).

In this modification, the stopper spring 42 including the contact part 42a has the locking release avoidance operability of the locking member 35, but does not come into contact with the locking release protrusion 35d to release the locking of the locking member 35 at the time of normal locking release. In other words, the stopper spring 42 has no normal locking release operability. Instead, at the time of normal locking release, the pressing part 37c of the lever bracket 37 comes into direct contact with the extended locking release protrusion 35d to perform the locking release. In the modification shown in FIG. 17, the operation force for the locking release is directly transmitted from the pressing part 37c of the lever bracket to the locking release protrusion 35d of the locking member 35 without passing through the stopper spring 42. Therefore, the operation force is reliably transmittable to the locking member 35, and deterioration in performance of the stopper spring 42 is suppressible.

(B) In the second embodiment, the shift restrictor (stopper spring 42) and the operation member (lever bracket 37) are independent of each other as described above, but may be formed into one body. Specifically, a lever bracket serving as both the shift restrictor including the contact part and the operation member may be provided and configured such that the contact part of the lever bracket engages with the upper end corner 41c of the opening 41b in the support bracket 41 so as to be positioned. In this modification, the shift restrictor (stopper spring 42) and the operation member (lever bracket 37) are formed into the one body, and therefore, no deviation occurs between the shift restrictor and the operation member. Consequently, the differences in the locking release avoidance operability at the locking of the locking member 35 are further reducible.

OTHER EMBODIMENTS (I) Although the main bodies 7a, 37a of the lever plate 7 and the lever bracket 37 (each representing the operation member) are rotatably supported in the upper rails 3, 33 about the second rotation axis S2 respectively in the first and second embodiments, the present invention is not limited thereto. Another configuration, e.g., where an operation member is provided in the upper rail 3, 33 slidably in the front-rear direction, may be adopted as long as the operation member can apply an operation force to the engagement member.

(II) Although the sliding devices 1, 31 are configured to permit the seat S for the automobile to be slidable and locked in a desired position respectively in the first and second embodiments, the present invention is not limited thereto. The sliding device according to the present invention is adoptable for locking of a seat in another field. For instance, the sliding device according to the present invention is adoptable for locking of a seat in a specific position, such as a seat to be arranged in another vehicle, e.g., a vessel and an airplane, in addition to the automobile, or a seat to be installed in a facility like an amusement arcade.

Summary of Embodiments

The embodiments are summarized in the following manner.

A sliding device according to each embodiment is a device for supporting a seat slidably in a front-rear direction and locking the seat in a desired position in the front-rear direction. The sliding device includes: a lower rail fixedly attached to a mounting surface over which the seat is placed; an upper rail having a portion to be fixedly attached to the seat, and guided by the lower rail movably in the front-rear direction; and a lock mechanism that locks the upper rail to the lower rail. The lower rail has a plurality of engaged parts arrayed in a longitudinal direction thereof. The lock mechanism includes: an engagement member that has an engaging part engageable with at least selected one of the engaged parts of the lower rail, and shifts between a locking position to keep the upper rail from moving by the engagement of the engaging part with the engaged part and a release position to release the locking; a first urging member that gives an urging force to the engagement member in a direction from the release position to the locking position; an operation member for shifting the engagement member from the locking position to the release position upon receiving an application of an operation force; and a shift restrictor that keeps the engagement member from shifting to the release position when the engagement member is in the locking position and no operation force is applied to the operation member.

The term "lock" or "locking" in the embodiment means fixedly keeping the seat or the upper rail from moving.

According to the configuration, the lock mechanism that locks the upper rail to the lower rail includes the engagement member and the operation member. The engagement member is shiftable between the locking position to keep the upper rail from moving by the engagement of the engaging part with the engaged part of the lower rail and the release position to release the locking. The engagement member receives the urging force from the first urging member to the locking position to be normally held in the locking position. However, the operation member receives the application of the operation force to allow the engagement member to shift from the locking position to the release position, resulting in achievement of the release of the locking of the engagement member against the urging force of the first urging member. In this configuration, the sliding device includes the shift restrictor that keeps the engagement member from shifting to the release position when the engagement member is in the locking position and no operation force is applied to the operation member. The shift restrictor thus can keep the engagement member from shifting to the release position when the engagement member is in the locking position. Accordingly, unintended locking release is avoidable without an excessive increase in the engagement force of the engaging part of the engagement member.

Here, the term "unintended locking release" means occurrence of locking-off that the engagement member shifts from the locking position to the release position even without an application of an operation force from the operation member to the engagement member by an operator. The "unintended locking release" is considered to occur due to, for example, a large vertical bounce of a vehicle during running thereof, sway of the body of a seated person in the front-rear direction, entry by a foreign matter into the lock mechanism, or another factor.

In the sliding device, the operation member preferably comprises the shift restrictor. Therefore, the configuration of the sliding device is simple, and an increase in each of the production cost and the weight of the sliding device is suppressible.

Preferably, the engagement member is rotatably supported in the upper rail about a first rotation axis extending in a width direction of the seat perpendicularly intersecting the front-rear direction to shift between the locking position and the release position. The operation member preferably includes: a main body rotatably supported in the upper rail about a second rotation axis extending in the width direction and between a first direction of applying the operation force to the engagement member and a second direction opposite to the first direction; and a first protrusion provided as the shift restrictor in the main body, the first protrusion being located at a side in a shifting direction towards the release position against the engagement member when the engagement member is in the locking position and no operation force is applied to the operation member.

In this configuration, the operation member includes the first protrusion serving as the shift restrictor on the main body for giving the operation force to the engagement member. Hence, the configuration of the operation member is simple, and the main body and the first protrusion are formable into one body. As a result, it is possible to further suppress the production cost and weight increase of the sliding device. Moreover, as the first protrusion of the operation member is located at a side in the shifting direction towards the release position against the engagement member, when the engagement member is in the locking position and no operation force is applied to the operation member. Accordingly, even when the engagement member is about to shift from the locking position to the release position, the first protrusion comes into contact with the engagement member to keep the engagement member from shifting to the release position.

In the sliding device, the engagement member preferably includes a second protrusion located at a position to come into contact with the first protrusion when the engagement member shifts to the release position without receiving the operation force in a condition where the engagement member is in the locking position and no operation force is applied to the operation member in the locking position.

Accordingly, even when the engagement member is about to shift to the release position without receiving the operation force, the second protrusion of the engagement member comes into contact with the first protrusion of the operation member, and hence the engagement member is kept from shifting to the release position. Thus, with the simple configuration, unintended locking release is reliably avoidable.

In the sliding device, the first protrusion is preferably located at a position to define a gap between the first protrusion and the second protrusion when the engagement member is in the locking position and no operation force is applied to the operation member.

This configuration can prevent the first protrusion and the second protrusion from always being in contact with each other to deteriorate by spacing the protrusions from each other at the gap therebetween when the engagement member is in the locking position. By contrast, when the engagement member is about to shift to the release position without receiving the operation force, the second protrusion moves only at a distance corresponding to the gap and comes into contact with first protrusion, and hence the engagement member is kept from shifting to the release position. Accordingly, unintended locking release is reliably avoidable.

In the sliding device, the operation member preferably further includes a first rotation regulation stopper that regulates a rotation of the main body at a predetermined rotation angle when the main body rotates in the second direction in a state where the engagement member is in the locking position.

According to this configuration, the first rotation regulation stopper regulates the rotation of the main body of the operation member at the predetermined angle when the main body rotates in the second direction opposite to the first direction of applying the operation force to the engagement member, resulting in preventing excessive rotation of the operation member.

In the sliding device, the operation member preferably further includes a second rotation regulation stopper that regulates the rotation of the main body at a predetermined rotation angle when the main body rotates in the first direction.

This leads to a success in preventing excessive rotation of the operation member when the main body of the operation member rotates in the first direction of applying the operation force to the engagement member.

Preferably, the sliding device further includes an operation shaft extending along the second rotation axis and being rotatable about the second rotation axis together with the operation member, and the main body has a fit hole for receiving the operation shaft to be fitted therein, and further the operation shaft is fitted in the fit hole to be connected to the main body, and has a taper part at a leading end thereof.

In this configuration including the operation shaft that rotates together with the operation member, the operation shaft is fitted in the fit hole of the main body of the operation member to be connected to the main body. The operation shaft has the taper part at the leading end thereof, and thus the operation shaft is smoothly insertable into the fit hole of the main body without being caught by an edge defining the fit hole at the insertion. Accordingly, assembly workability of the sliding device improves.

Preferably, the sliding device further includes a second urging member that urges the main body of the operation member in the second direction, and the operation shaft has a recess in which the second urging member is fitted to keep the operation shaft and the second urging member from shifting relative to each other in a longitudinal direction of the operation shaft.

In this configuration further including the second urging member that urges the main body of the operation member in the second direction opposite to the first direction of applying the operation force to the engagement member by the main body of the operation member, the operation shaft has the recess in which the second urging member is fitted to keep the operation shaft and the second urging member from shifting relative to each other in the longitudinal direction of the operation shaft. The second urging member is fitted in the recess of the operation shaft so that the second urging member serves as a retainer to prevent the operation shaft from coming off the fit hole of the main body.

In the sliding device, preferably, the engagement member is rotatably supported in the upper rail about a first rotation axis extending in a width direction of the seat perpendicularly intersecting the front-rear direction to shift between the locking position and the release position. The operation member preferably includes: a main body rotatably supported in the upper rail about a second rotation axis extending in the width direction and between a first direction of applying the operation force to the engagement member and a second direction opposite to the first direction; and a pressing part provided on the main body for pressing the engagement member in a direction of shifting to the release position when the main body rotates in the first direction. Preferably, the shift restrictor has a contact part contactable with the engagement member, and the contact part is located at a contact position to come into contact with the engagement member in a shifting direction of the engagement member to the release position when the engagement member is in the locking position and no operation force is applied to the operation member, and the contact part moves away from the contact position to a retract position away from the shifting direction of the engagement member to the release position when the operation member rotates in the first direction and the pressing part presses the contact part with the engagement member.

According to this configuration, the shift restrictor has the contact part contactable with the engagement member. The contact part is located at a contact position to come into contact with the engagement member in the shifting direction of the engagement member to the release position when the engagement member is in the locking position and no operation force is applied to the operation member. Therefore, even when the engagement member is about to shift to the release position, the engagement member can be kept from shifting to the release position by the contact with the contact part in the state where the engagement member is in the locking position. Accordingly, unintended locking release is avoidable without an excessive increase in the engagement force of the engaging part of the engagement member. Contrarily, the pressing part presses the contact part with the engagement member to move the contact part from the contact position to the retract position away from the shifting direction of the engagement member to the release position when the operation member rotates in the first direction. This ensures release of shift restriction of the engagement member. Consequently, when the operation member rotates in the first direction, the pressing part allows the engagement member to reliably shift to the release position with its pressing force to the engagement member.

In the sliding device, preferably, the contact part has a shape extending in the width direction of the seat, and the sliding device further includes a holding part that is engaged with opposite ends of the contact part in the width direction of the seat to hold the contact part at the contact position when the contact part is at the contact position.

In this configuration, the holding part is engaged with the opposite ends of the contact part in the width direction of the seat to reliably hold the contact part at the contact position when the contact part is at the contact position. Besides, the holding part is engaged with the opposite ends of the contact part to achieve the positioning of the contact part while suppressing variations.

In the sliding device, the shift restrictor preferably further includes an urging part that urges the contact part from the retract position to the contact position.

In this configuration, the urging part urges the contact part from the retract position to the contact position. Therefore, the contact part is reliably maintained at the contact position in the state where no operation force is applied to the operation member, i.e., in the state where the pressing part does not press the contact part.

In the sliding device, the contact part and the urging part are preferably formed into a single spring.

This configuration achieves a decrease in the number of components structuring the shift restrictor, and reduction in each of the size and the production cost of the sliding device.

In the sliding device, the engagement member preferably further includes a contacted part extending to a position to come into direct contact with the pressing part without coming into contact with the spring when the operation member receives an application of the operation force in the state where the engagement member is in the locking position.

In this configuration, the operation force for the locking release is directly transmitted from the pressing part of the operation member to the extended contacted part of the engagement member without passing through the spring. Hence, the operation force is reliably transmittable to the engagement member, and deterioration in the performance of the spring is suppressible.

In the sliding device, the contact part is preferably disposed between the pressing part and the engagement member to allow the pressing part to press the engagement member to the release position via the contact part when the operation member rotates in the first direction.

In this configuration, the pressing part presses the contact part and further presses the engagement member to the release position via the contact part to allow the engagement member to shift to the release position when the operation member rotates in the first direction. Thus, the pressing part can press the engagement member by using its pressing force to the contact part. This establishes a single route of transmitting the pressing force, and therefore dispersion of the force is suppressible. As a result, the operation force to the operation member is reducible.

In the sliding device, the shift restrictor and the operation member are preferably formed into one body.

In this configuration, the shift restrictor and the operation member are formed into the one body, and therefore, no deviation occurs between the shift restrictor and the operation member. Consequently, differences in the locking release avoidance operability at the locking of the engagement member is further reducible.

In the sliding device, the engagement member preferably includes a contact protrusion located at a position to come into contact with the contact part when the engagement member shifts to the release position in the state where the engagement member is in the locking position and no operation force is applied to the operation member.

In this configuration, even when the engagement member is about to shift to the release position without receiving the operation force, the contact protrusion of the engagement member comes into contact with the contact part of the shift restrictor, and hence the engagement member is kept from shifting to the release position. Thus, with the simple configuration, unintended locking release is reliably avoidable.

The sliding device according to the embodiment can avoid unintended locking release without depending on an excessive engagement force of the engagement member.

The invention claimed is:

1. A sliding device for supporting a seat slidably in a front-rear direction and locking the seat in a desired position in the front-rear direction, the sliding device comprising:
   a lower rail fixedly attached to a mounting surface over which the seat is placed;
   an upper rail having a portion to be fixedly attached to the seat, and guided by the lower rail movably in the front-rear direction; and
   a lock mechanism that locks the upper rail to the lower rail, wherein
   the lower rail has a plurality of engaged parts arrayed in a longitudinal direction thereof, and
   the lock mechanism includes:
      an engagement member that has an engaging part engageable with at least selected one of the engaged parts of the lower rail, and shifts between a locking position to keep the upper rail from moving by the engagement of the engaging part with the engaged part and a release position to release the locking;
      a first urging member that gives an urging force to the engagement member in a direction from the release position to the locking position;
      an operation member for shifting the engagement member from the locking position to the release position upon receiving an application of an operation force; and
      a shift restrictor that keeps the engagement member from shifting to the release position when the engagement member is in the locking position and no operation force is applied to the operation member, wherein
   the engagement member is rotatably supported in the upper rail about a first rotation axis extending in a width direction of the seat perpendicularly intersecting the front-rear direction to shift between the locking position and the release position,
   the operation member includes:
      a main body rotatably supported in the upper rail about a second rotation axis extending in the width direction and between a first direction of applying the operation force to the engagement member and a second direction opposite to the first direction; and
      a pressing part provided on the main body for pressing the engagement member in a direction of shifting to the release position when the main body rotates in the first direction,
   the shift restrictor has a contact part contactable with the engagement member, and
   the contact part is located at a contact position to come into contact with the engagement member in a shifting direction of the engagement member to the release position when the engagement member is in the locking position and no operation force is applied to the operation member, and the contact part moves away from the contact position to a retract position away from the shifting direction of the engagement member to the release position when the operation member rotates in the first direction and the pressing part presses the contact part with the engagement member.

2. The sliding device according to claim 1, wherein the contact part has a shape extending in the width direction of the seat,
   the sliding device further comprising a holding part that is engaged with opposite ends of the contact part in the width direction of the seat to hold the contact part at the contact position when the contact part is at the contact position.

3. The sliding device according to claim 1 wherein, the shift restrictor further includes an urging part that urges the contact part from the retract position to the contact position.

4. The sliding device according to claim 3, wherein the contact part and the urging part are formed into a single spring.

5. The sliding device according to claim 4, wherein the engagement member further includes a contacted part extending to a position to come into direct contact with the pressing part without coming into contact with the spring when the operation member receives an application of the operation force in the state where the engagement member is in the locking position.

6. The sliding device according to claim 1, wherein the contact part is disposed between the pressing part and the engagement member to allow the pressing part to press the engagement member to the release position via the contact part when the operation member rotates in the first direction.

7. The sliding device according to claim 1, wherein the shift restrictor and the operation member are formed into one body.

8. The sliding device according to claim 1, wherein the engagement member includes a contact protrusion located at a position to come into contact with the contact part when the engagement member shifts to the release position in the state where the engagement member is in the locking position and no operation force is applied to the operation member.

* * * * *